United States Patent
Yamamoto et al.

(10) Patent No.: US 9,073,482 B2
(45) Date of Patent: Jul. 7, 2015

(54) IMAGE DISPLAY SYSTEM, IMAGE PROCESSING APPARATUS, AND IMAGE DISPLAY METHOD

(75) Inventors: Chiharu Yamamoto, Kobe (JP); Yasuyoshi Sawada, Kobe (JP); Sunja Imu, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 482 days.

(21) Appl. No.: 13/475,278

(22) Filed: May 18, 2012

(65) Prior Publication Data
US 2012/0300075 A1  Nov. 29, 2012

(30) Foreign Application Priority Data
May 24, 2011  (JP) ................. 2011-116163

(51) Int. Cl.
*H04N 7/18* (2006.01)
*B60R 1/00* (2006.01)

(52) U.S. Cl.
CPC . *B60R 1/00* (2013.01); *H04N 7/185* (2013.01)

(58) Field of Classification Search
CPC ............ H04N 7/185; H04N 7/18; B60R 1/00; G06K 9/00771; G06K 9/00; G08B 13/196
USPC ........................................................ 348/148
See application file for complete search history.

(56) References Cited

U.S. PATENT DOCUMENTS

| | | | |
|---|---|---|---|
| 5,670,935 A * | 9/1997 | Schofield et al. ............. 340/461 |
| 6,498,620 B2 * | 12/2002 | Schofield et al. ............. 348/148 |
| 6,772,057 B2 * | 8/2004 | Breed et al. ...................... 701/45 |
| 7,366,595 B1 * | 4/2008 | Shimizu et al. ................ 701/301 |
| 7,640,107 B2 * | 12/2009 | Shimizu et al. ................ 701/523 |
| 7,660,659 B2 * | 2/2010 | Watanabe et al. ................ 701/96 |
| 7,689,359 B2 * | 3/2010 | Tokoro et al. ................. 701/301 |
| 8,108,147 B1 * | 1/2012 | Blackburn ..................... 701/301 |
| 2003/0122930 A1 * | 7/2003 | Schofield et al. ............. 348/148 |
| 2004/0051634 A1 * | 3/2004 | Schofield et al. ............. 340/461 |
| 2005/0179527 A1 * | 8/2005 | Schofield ...................... 340/435 |

(Continued)

FOREIGN PATENT DOCUMENTS

| | | |
|---|---|---|
| CN | 2670179 Y | 1/2005 |
| CN | 1878299 A | 12/2006 |

(Continued)

OTHER PUBLICATIONS

Chen et al, An Embedded System for Vehicle Surrounding Monitoring, 2009.*

(Continued)

*Primary Examiner* — Shan Elahi
(74) *Attorney, Agent, or Firm* — Oliff PLC

(57) ABSTRACT

An image display system is configured to display an image. An obtaining unit is configured to obtain a surrounding image indicating surroundings of a vehicle. A plurality of detecting units are disposed on the vehicle at different positions and configured to detect an object existing around the vehicle, respectively. If one of the detecting units detects the object, the one of the detecting units is referred to as specific detecting unit. An overlapping unit is configured to overlap an indicator represented in the form of a frame with the surrounding image. The indicator indicates the object and the specific detecting unit which has detected the object. A display unit is configured to display the surrounding image with which the indicator is overlapped.

8 Claims, 23 Drawing Sheets

(56) References Cited

U.S. PATENT DOCUMENTS

| | | |
|---|---|---|
| 2005/0200700 A1* | 9/2005 | Schofield et al. ............. 348/148 |
| 2005/0232469 A1* | 10/2005 | Schofield et al. ............. 382/104 |
| 2006/0125919 A1* | 6/2006 | Camilleri et al. ............. 348/148 |
| 2006/0184297 A1* | 8/2006 | Higgins-Luthman ............ 701/41 |
| 2006/0192660 A1* | 8/2006 | Watanabe et al. ............. 340/435 |
| 2006/0274147 A1 | 12/2006 | Chinomi et al. |
| 2007/0120657 A1* | 5/2007 | Schofield et al. ............. 340/435 |
| 2008/0129539 A1* | 6/2008 | Kumon ........................ 340/901 |
| 2009/0040306 A1* | 2/2009 | Foote et al. .................... 348/148 |
| 2009/0262192 A1* | 10/2009 | Schofield et al. ............. 348/148 |
| 2011/0095910 A1* | 4/2011 | Takano ...................... 340/932.2 |
| 2011/0106380 A1* | 5/2011 | Wang et al. ..................... 701/36 |
| 2013/0010117 A1* | 1/2013 | Miyoshi et al. ............... 348/148 |
| 2013/0010118 A1* | 1/2013 | Miyoshi et al. ............... 348/148 |

FOREIGN PATENT DOCUMENTS

| | | | |
|---|---|---|---|
| EP | 1170172 A2 * | 1/2002 | ............... B60Q 1/48 |
| JP | A-2002-19492 | 1/2002 | |
| JP | A-2006-352368 | 12/2006 | |
| JP | A-2010-184604 | 8/2010 | |

OTHER PUBLICATIONS

Chinese Office Action and Search Report issued in Chinese Patent Application No. 201210164771.5 on Mar. 4, 2014 (with translation).

* cited by examiner

*FIG. 7*

| SONAR | DISTANCE (m) | INDICATOR CODE |
|---|---|---|
| FIRST | 0.5 | A1 |
| FIRST | 1.0 | A2 |
| FIRST | 1.5 | A3 |
| SECOND | 0.5 | B1 |
| SECOND | 1.0 | B2 |
| SECOND | 1.5 | B3 |
| THIRD | 0.5 | C1 |
| THIRD | 1.0 | C2 |
| THIRD | 1.5 | C3 |
| FOURTH | 0.5 | A4 |
| FOURTH | 1.0 | A5 |
| FOURTH | 1.5 | A6 |
| FIFTH | 0.5 | B4 |
| FIFTH | 1.0 | B5 |
| FIFTH | 1.5 | B6 |
| SIXTH | 0.5 | C4 |
| SIXTH | 1.0 | C5 |
| SIXTH | 1.5 | C6 |

FIG. 13

| SONAR | DISTANCE (m) | INDICATOR CODE |
|---|---|---|
| FIRST·SECOND | 0.5 | AB1 |
| FIRST·SECOND | 1.0 | AB2 |
| FIRST·SECOND | 1.5 | AB3 |
| SECOND·THIRD | 0.5 | BC1 |
| SECOND·THIRD | 1.0 | BC2 |
| SECOND·THIRD | 1.5 | BC3 |
| FIRST·SECOND·THIRD | 0.5 | ABC1 |
| FIRST·SECOND·THIRD | 1.0 | ABC2 |
| FIRST·SECOND·THIRD | 1.5 | ABC3 |
| FOURTH·FIFTH | 0.5 | AB4 |
| FOURTH·FIFTH | 1.0 | AB5 |
| FOURTH·FIFTH | 1.5 | AB6 |
| FIFTH·SIXTH | 0.5 | BC4 |
| FIFTH·SIXTH | 1.0 | BC5 |
| FIFTH·SIXTH | 1.5 | BC6 |
| FOURTH·FIFTH·SIXTH | 0.5 | ABC4 |
| FOURTH·FIFTH·SIXTH | 1.0 | ABC5 |
| FOURTH·FIFTH·SIXTH | 1.5 | ABC6 |

IMAGE DISPLAY SYSTEM, IMAGE PROCESSING APPARATUS, AND IMAGE DISPLAY METHOD

The disclosure of Japanese Patent Application No. 2011-116163 filed on May 24, 2011, including specification, drawings and claims is incorporated herein by reference in its entirety.

BACKGROUND

The invention relates to a technology of displaying an image.

When parking a vehicle, a user (for example, a driver) should pay close attention to avoid contact with other vehicles. Also, when starting the parked vehicle, the user should pay close attention to avoid contact with a pedestrian crossing an advancing direction of the vehicle. In addition, when driving the vehicle on a narrow road, the user should pay close attention to avoid contact with objects located around the vehicle. However, even if the user pays close attention, the user may bring the vehicle into contact with those objects. Therefore, there is provided an image display system which supports driving by displaying a surrounding image indicating surroundings of the vehicle on a display mounted on the vehicle, thereby enabling the user to notice existence of the object around the vehicle and avoid contact with the object (see Patent Document 1).

Patent Document 1: Japanese Patent Application Publication No. 2002-019492

However, even if the image indicating surroundings of the vehicle is displayed on the display, as the user is not able to notice a direction or a location of the object exiting around vehicle and thus may bring the vehicle into contact with the object.

SUMMARY

It is therefor an object of the present invention to provide a technology of enabling a user to notice a direction or a location of an object existing around a vehicle in an image indicating surroundings of the vehicle.

In order to achieve the above object, according to a first aspect of the embodiments of the present invention, there is provided an image display system configured to display an image, comprising: an obtaining unit configured to obtain a surrounding image indicating surroundings of a vehicle; a plurality of detecting units disposed on the vehicle at different positions and configured to detect an object existing around the vehicle, respectively; an overlapping unit configured to overlap an indicator represented in the form of a frame with the surrounding image, the indicator indicating the object and a specific detecting unit which has detected the object from among the plurality of detecting units; and a display unit configured to display the surrounding image with which the indicator is overlapped.

According to a second aspect of the embodiments of the present invention, there is provided an image processing apparatus configured to process an image, comprising: an obtaining unit configured to obtain a surrounding image indicating surroundings of a vehicle; a specifying unit configured to specify, from among a plurality of detecting units which are disposed on the vehicle at different positions and configured to detect an object existing around the vehicle, respectively, a specific detecting unit which has detected the object; an overlapping unit configured to overlap an indicator represented in the form of a frame with the surrounding image, the indicator indicating the object and the specific detecting unit; and an outputting unit configured to output the surrounding image with which the indicator is overlapped to a display apparatus.

According to a third aspect of the embodiments of the present invention, there is provided an image display method for displaying an image, comprising: obtaining a surrounding image indicating surroundings of a vehicle; detecting an object existing around the vehicle with using a plurality of detecting units which are disposed on the vehicle at different positions and configured to detect the object existing around the vehicle, respectively, overlapping an indicator represented in the form of a frame with the surrounding image, the indicator indicating the object and a specific detecting unit which has detected the object from among the plurality of detecting units; and displaying the surrounding image with which the indicator is overlapped.

In the first to third aspects, the plurality of detecting units are disposed on the vehicle at different positions and configured to detect the object existing around the vehicle. If one of the plurality of detecting units detects the object, the one of the detecting units is referred to as a specific detecting unit. The object and the specific detecting unit which has detected the object are indicated by the indicator which is to be represented in the form of a frame. Since the indicator overlapped with the surrounding image indicating surroundings of the vehicle is displayed, the user can exactly recognize the direction and the location of the object.

According to a fourth aspect of the embodiments of the present invention, there is provided an image display system configured to display an image, comprising: an obtaining unit configured to obtain a surrounding image indicating surroundings of a vehicle; a detecting unit configured to detect an object existing around the vehicle; an overlapping unit configured to overlap an indicator represented in the form of a frame with the surrounding image, the indicator indicating the object and the detecting unit which has detected the object; and a displaying unit configured to display the surrounding image with which the indicator is overlapped.

According to the fourth aspect, since the indicator represented in the form of a frame and indicating the object and the detecting unit which has detected an object existing around a vehicle and the object and is represented in the form of a frame is overlapped with a surrounding image, a user can exactly recognize a direction and a location of the object.

In the fourth aspect, the detecting unit is configured to detect the object existing around the vehicle. The object and the detecting unit which has detected the object are indicated by the indicator which is to be represented in the form of a frame. Since the indicator overlapped with the surrounding image indicating surroundings of the vehicle is displayed, the user can exactly recognize the direction and the location of the object.

In the image display system, if there are a plurality of specific detecting units which have detected the object, the overlapping unit may overlap an indicator represented in the form of a single frame with the surrounding image, the indicator indicating the object and the plurality of specific detecting units.

With this configuration, if two or more of the plurality of detecting units detect the object, the object and the two or more of the specific detecting units are indicated by an indicator which is to be represented in the form of a single frame. Since the indicator overlapped with the surrounding image is displayed, the user can exactly recognize the direction and the location of the object.

In the image display system, each of the detecting units may configured to detect a distance between each of the detecting units and the object, and the overlapping unit may be configured to change a size of the indicator according to the distance.

With this configuration, since the size of the indicator which is to be displayed is changed according to the distance between the object and the specific detecting unit, the user can sensuously recognize the distance between the object and the vehicle with the detecting units.

BRIEF DESCRIPTION OF THE DRAWINGS

In the accompanying drawings:

FIG. 7 is a diagram illustrating map data according to the first embodiment;

FIG. 13 is a diagram illustrating map data according to the second embodiment;

DETAILED DESCRIPTION OF THE EMBODIMENTS

Hereinafter, the embodiments of the present invention will be described in detail with reference to the accompanying drawings.

1. First Embodiment

Figure 1:
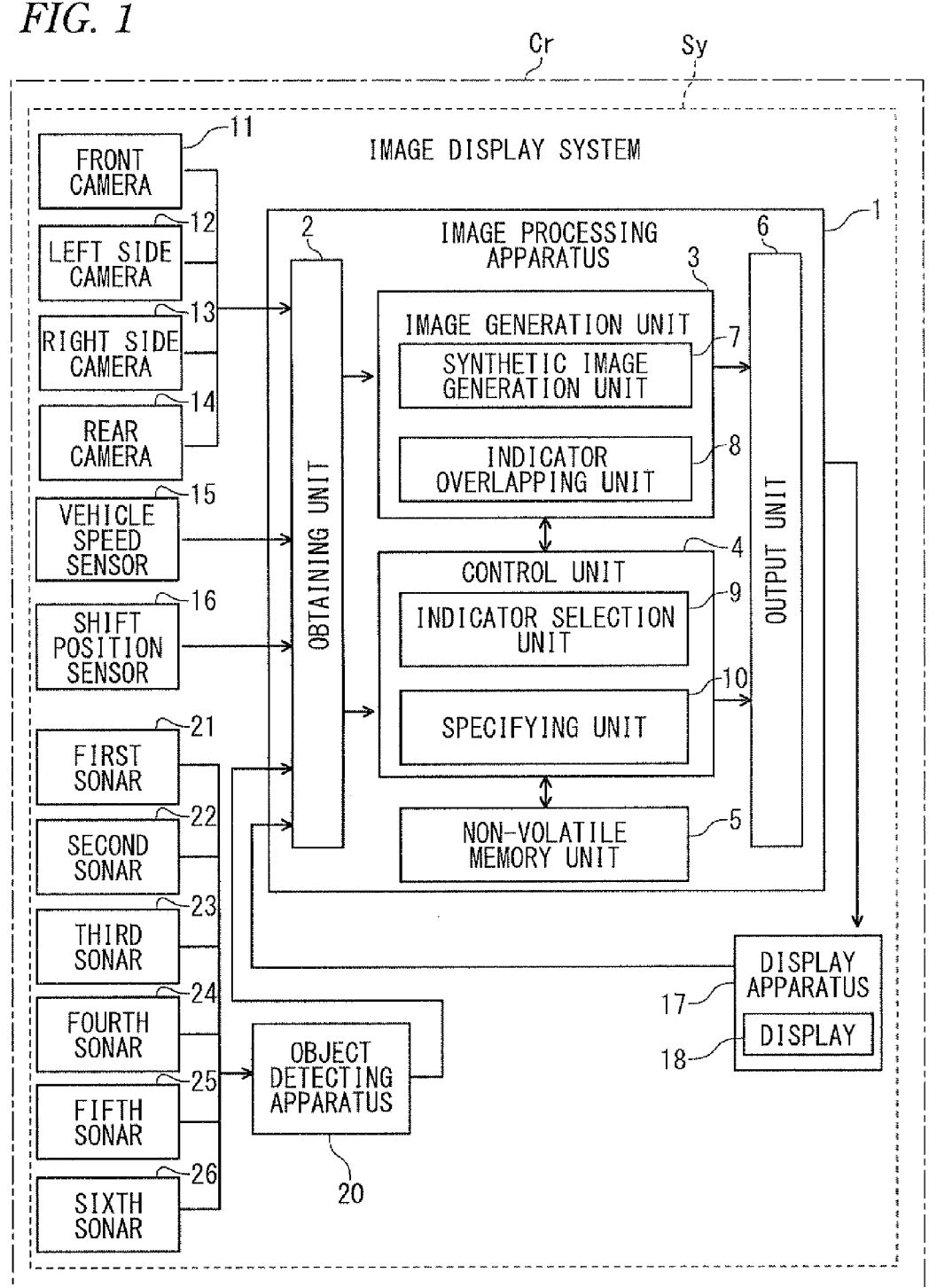
FIG. 1 is a diagram illustrating a configuration of an image display system according to a first embodiment.

FIG. 1 is a diagram illustrating a configuration of an image display system Sy according to a first embodiment. The image display system Sy is able to display an indicator indicating a location and a direction of an object existing around a vehicle by overlapping the indicator with an image indicating surroundings of the vehicle.

<1-1. Configuration>

The image display system Sy includes a front camera 11, a left side camera 12, a right side camera 13, a rear camera 14 (hereinafter, referred to as cameras 11 to 14), a vehicle speed sensor 15, a shift position sensor 16, an image processing apparatus 1, an object detecting apparatus 20, and a display apparatus 17.

The image processing apparatus 1 is electrically connected to the cameras 11 to 14, the vehicle speed sensor 15, the shift position sensor 16, the display apparatus 17, and the object detecting apparatus 20 through a cable. Also, the object detecting apparatus 20 is electrically connected to a first sonar 21, a second sonar 22, a third sonar 23, a fourth sonar 24, a fifth sonar 25, a sixth sonar 26 (hereinafter, referred to as sonars 21 to 26), and the image processing apparatus 1 through a cable.

Figure 2:
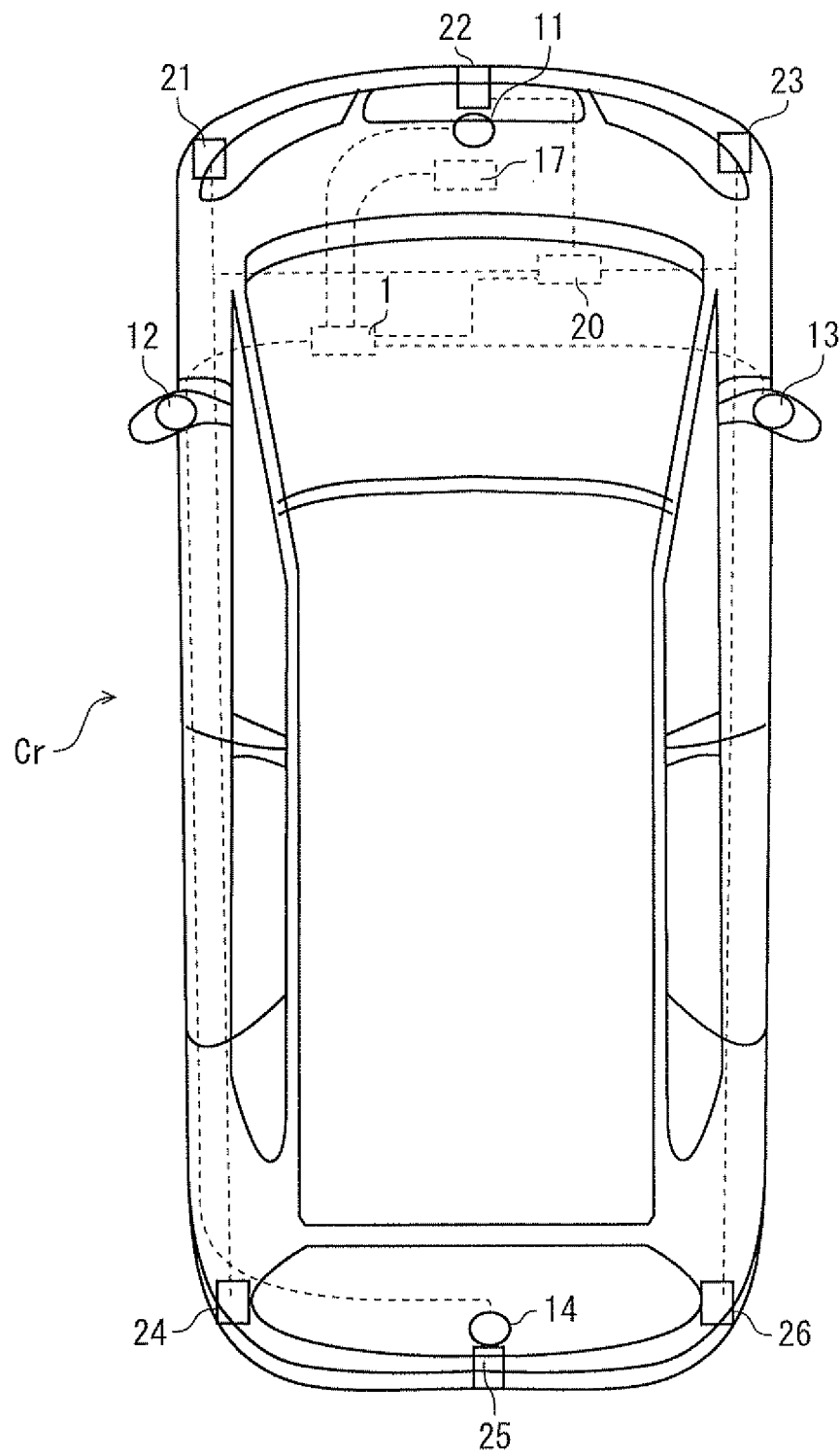
FIG. 2 is a diagram illustrating positions of cameras and sonars attached to a vehicle according to the first embodiment.

FIG. 2 is a diagram illustrating positions of the cameras 11 to 14 and the sonars 21 to 26 attached to a vehicle Cr.

As shown in FIG. 2, the front camera 11 is disposed in the proximity to a horizontal center of a front end of the vehicle Cr, and an optical axis thereof approximately follows forward and backward directions of the vehicle Cr and is oriented in a forward direction. The left side camera 12 is disposed on a left side mirror and an optical axis thereof approximately follows left and right directions of the vehicle Cr and is oriented in a left direction with reference to the forward direction. The right side camera 13 is disposed on a right side mirror and an optical axis thereof approximately follows the left and right directions of the vehicle Cr and is oriented in a right direction with reference to the forward direction. The rear camera 14 is disposed in the proximity to a horizontal center of a rear end of the vehicle Cr, and an optical axis thereof approximately follows the forward and backward directions of the vehicle Cr and is oriented in a reverse direction to the forward direction. It is preferable that the front camera 11 and the rear camera 14 are attached to an approximately horizontal center, but the front camera 11 and the rear camera 14 may be attached to a position slightly deviating from the horizontal center in a left or right direction.

Figure 3:
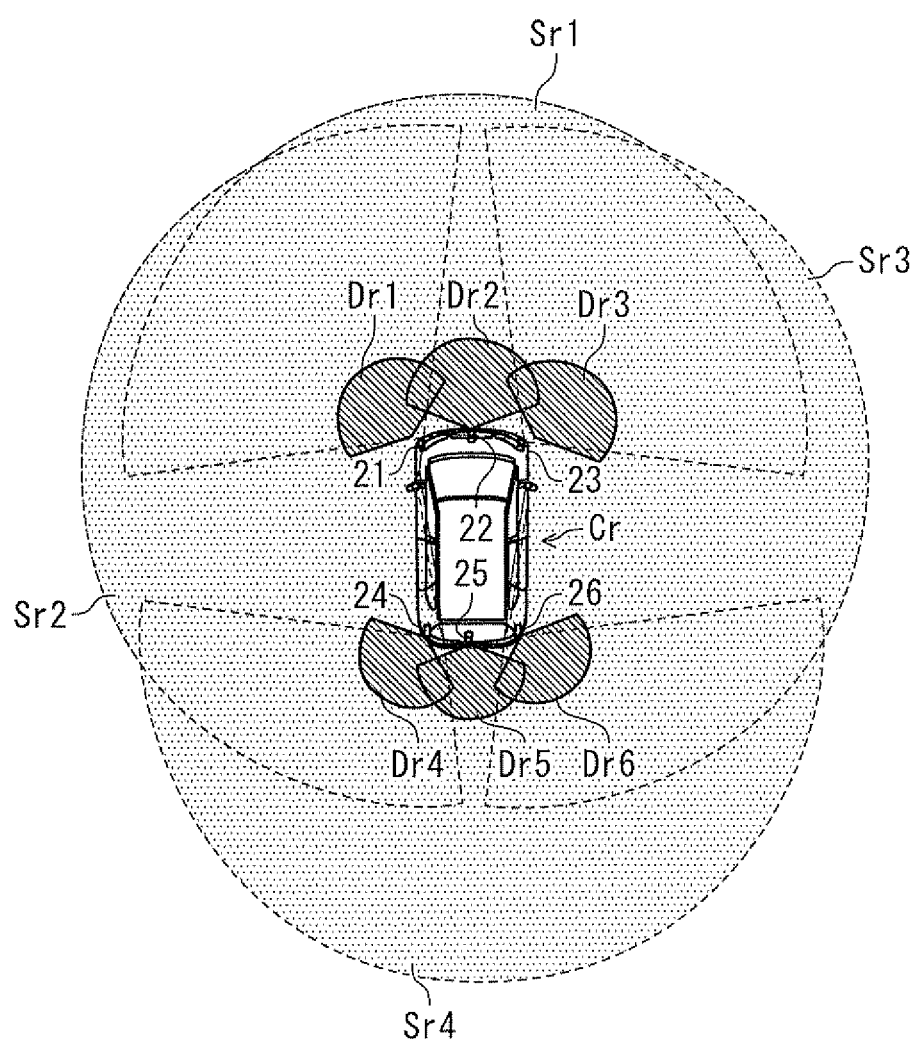
FIG. 3 is a diagram illustrating photographing ranges of the cameras and object detecting ranges of the sonars according to the first embodiment.

Each of the cameras 11 to 14 includes a fisheye lens. The cameras 11 to 14 including the fisheye lens have an angle of view greater than or equal to 180°. As shown in FIG. 3, photographing ranges Sr1 to Sr4 of the cameras 11 to 14 cover surroundings of the vehicle Cr. Using such cameras 11 to 14, the whole surroundings of the vehicle Cr can be photographed.

The sonars 21 to 26 are disposed at different positions of the vehicle Cr as shown in FIG. 2. The first sonar 21 is disposed in the proximity to a left corner of a front side of the vehicle Cr and an ultrasonic wave output direction thereof is oriented to an outside of the left corner of the front side of the vehicle Cr. The second sonar 22 is disposed in the proximity to the front camera 11 of the vehicle Cr and an ultrasonic wave output direction thereof is oriented to an outside of the horizontal center of the front end of the vehicle Cr. The third sonar 23 is disposed in the proximity to a right corner of the front side of the vehicle Cr and an ultrasonic wave output direction thereof is oriented to an outside of the right corner of the front side of the vehicle Cr. The fourth sonar 24 is disposed in the proximity to a left corner of a rear side of the vehicle Cr and an ultrasonic wave output direction thereof is oriented to an outside of the left corner of the rear side of the vehicle Cr. The fifth sonar 25 is disposed in the proximity to the rear camera 14 of the vehicle Cr and an ultrasonic wave output direction thereof is oriented to an outside of the horizontal center of the rear end of the vehicle Cr. The sixth sonar 26 is disposed in the proximity to a right corner of the rear side of the vehicle Cr and an ultrasonic wave output direction thereof is oriented to an outside of the right corner of the rear side of the vehicle Cr.

The sonars 21 to 26 receive ultrasonic waves that are output from each sonars, collide with a certain object, and are reflected from the object, and output signals regarding the ultrasonic waves to the object detecting apparatus 20. As shown in FIG. 3, detecting ranges Dr1, Dr2, and Dr3 made when an object is detected by the first sonar 21, the second sonar 22, and the third sonar 23 cover front surroundings of the vehicle Cr. On the other hand, as shown in FIG. 3, detecting ranges Dr4, Dr5, and Dr6 made when an object is detected by the fourth sonar 24, the fifth sonar 25, and the sixth sonar 26 cover rear surroundings of the vehicle Cr. Using such sonars 21 to 26, at least an object existing in a forward direction and a backward direction of the vehicle Cr is detected.

Referring back to FIG. 1, the vehicle speed sensor 15 is a sensor that senses a speed of the vehicle Cr and outputs a signal regarding the speed to the image processing apparatus 1.

The shift position sensor 16 is a sensor that senses a shift position of the vehicle Cr and outputs a signal regarding the shift position to the image processing apparatus 1.

The object detecting apparatus 20 receives a signal regarding ultrasonic waves from one of the sonars 21 to 26, and determines which of the sonars 21 to 26 has detected an object based on the input signal and determines a distance between the sonar that has detected the object and the object. The object detecting apparatus 20 outputs a signal indicating the sonar that has detected the object, and a signal indicating the distance between the sonar that has detected the object and the object to the image processing apparatus 1.

The image processing apparatus 1 includes an obtaining unit 2, an image generation unit 3, a control unit 4, a non-volatile memory unit 5, and an output unit 6. The obtaining unit 2 is an interface interfacing with an external apparatus, for example, and obtains an image photographed by the cameras 11 to 14. The output unit 6 is an interface interfacing with an external apparatus, for example, and outputs an image to be displayed to an outside such as the display apparatus 17.

The image generation unit 3 is a hardware circuit such as an application specific integrated circuit (ASIC), for example, and has a function of processing an image. The image generation unit 3 includes a synthetic image generation unit 7 and an indicator overlapping unit 8 as a part of its function. The synthetic image generation unit 7 generates a synthetic image by synthesizing images which are photographed by the cameras 11 to 14 and indicate surroundings of the vehicle Cr. The images photographed by the cameras 11 to 14 and the synthetic image in which the images are synthesized may be referred to as a surrounding image indicating the surroundings of the vehicle Cr. The indicator overlapping unit 8 overlaps an indicator that indicates a sonar which has detected an object existing around the vehicle Cr from among the sonars 21 to 26 and the object, and is represented in the form of a frame, with the synthetic image.

The frame is shaped in a sector form and has a transparent inside, and has a rectangular portion in the proximity to a central angle of the sector form. The indictor is overlapped with the surrounding image by placing the rectangular portion of the sector form in the proximity to the sonar which has detected the object in the surrounding image, making an arc portion of the sector form oriented to an outside of the vehicle Cr in the surrounding image, and placing at least part of the object within the sector form. The indicator is overlapped with the surrounding image in this way so that the indicator represented in the form of the frame can indicate the sonar which has detected the object and the object in the surrounding image. That is, a user can recognize a location and a direction of the object in the surrounding image. A range indicated by the indicator approximately corresponds to a detecting range of the sonar which has detected the object.

The control unit 4 is a micro computer that includes a central processing unit (CPU), a read only memory (ROM), and a random access memory (RAM). The CPU achieve various functions by performing an operation process according various programs memorized in the ROM.

The control unit 4 includes an indicator selection unit 9 and a specifying unit 10 as a part of the function achieved by the operation process. The indicator selection unit 9 selects an indicator corresponding to the sonar which has detected the object from among the sonars 21 to 26 from among various indicators memorized in the non-volatile memory unit 5. The specifying unit 10 specifies which of the sonars 21 to 26 has detected the object and specifies the distance between the sonar which has detected the object and the object based on the signal indicating the sonar and the signal indicating the distance, which are obtained from the object detecting apparatus 20 through the obtaining unit 2.

The non-volatile memory unit 5 is an electrically erasable programmable read-only memory (EEPROM), for example. The non-volatile memory unit 5 memorizes various indicators selected by the indicator selection unit 9, for example.

The display apparatus 17 includes a display 18 as a part of its function. The display 18 is a touch panel display, for example, and has a function of displaying various images and a function of receiving a user manipulation. A signal indicating the user manipulation is input to the control unit 4 through the obtaining unit 2. Accordingly, the image processing apparatus 1 is able to perform a process corresponding to user's instructions.

<1-2. Image Synthesizing Process>

Next, an image synthesizing process by the image display system Sy will be explained. The image synthesizing process is executed if a vehicle speed of the vehicle Cr is lower than or equal to a predetermined speed (for example, 12 km/h) or if a shift position is 'R'. Specifically, a signal regarding a vehicle speed is obtained from the vehicle speed sensor 15, and, if it is determined that the vehicle speed is lower than or equal to a predetermined speed based on the obtained signal, the synthetic image generation unit 7 executes the image synthesizing process. Also, a signal regarding a shift position is obtained from the shift position sensor 16, and, if it is determined that the shift position is 'R' based on the obtained signal, the synthetic image generation unit 7 executes the image synthesizing process. That is, in this case, the image display system Sy enters a monitoring mode to monitor the surroundings of the vehicle Cr, and executes the image synthesizing process, thereby displaying a synthetic image indicating the surroundings of the vehicle Cr on the display 18.

Figure 4:
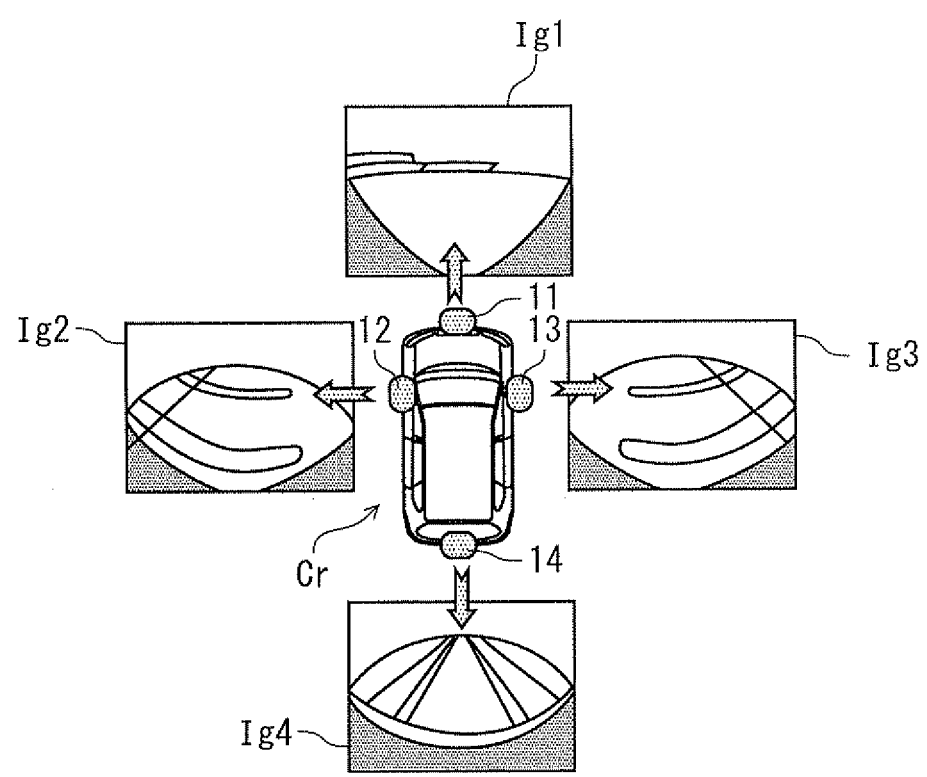
FIG. 4 is a diagram illustrating examples of images photographed by a plurality of cameras, respectively, according to the first embodiment.
Figure 5:
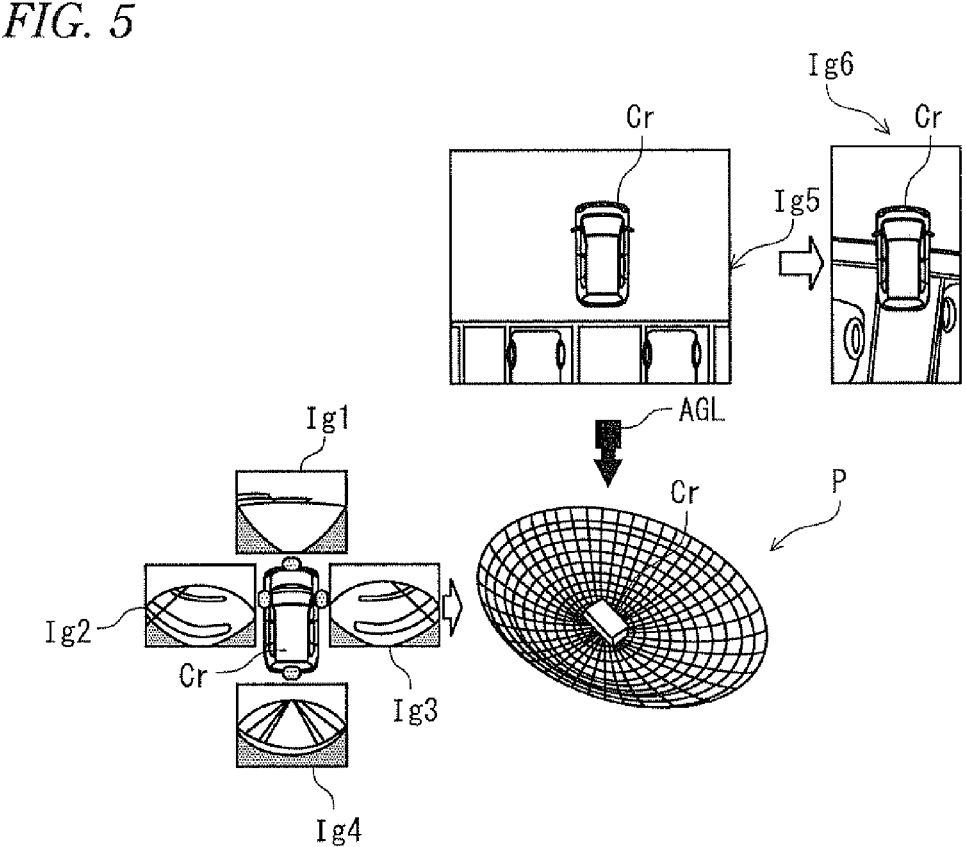
FIG. 5 is a diagram to explain an image synthesizing process which synthesizes images of surroundings of the vehicle photographed by the plurality of cameras according to the first embodiment.

FIG. 5 is a diagram to explain an image synthesizing process which synthesizes images of surroundings of the vehicle Cr photographed by the cameras 11-14. First, the obtaining unit 2 included in the image processing apparatus 1 obtains images Ig1 to Ig4 photographed by the cameras 11 to 14 as shown in FIG. 4 from the cameras 11 to 14. The obtaining unit 2 outputs the obtained images Ig1 to Ig4 to the image generation unit 3.

The image generation unit 3 memorizes the input images Ig1 to Ig4 in a volatile memory unit (not shown).

The synthetic image generation unit 7 projects the images Ig1 to Ig4, which are memorized in the volatile memory unit, onto a 3-dimensional (3D) curved surface P in a virtual 3D space as shown in FIG. 5.

Next, a point of view is placed right above an approximate center of a position of the vehicle Cr, a virtual point of view (AGL) with a direction of view being downwardly oriented is set, and a part of the 3D curved surface P is cut off according to the virtual point of view (AGL) as an image. Accordingly, a synthetic image Ig5 indicating the vehicle Cr and the surrounding area of the vehicle Cr is generated as if the vehicle Cr is viewed from right above the vehicle Cr.

The image processing apparatus 1 generates a synthetic image that is viewed from a predetermined point of view around the vehicle Cr using the above function of the synthetic image generation unit 7, and displays the synthetic image on the display apparatus 17. Accordingly, the synthetic image generation unit 7 generates a synthetic image of the vehicle Cr that is virtually viewed from above.

The generated synthetic image Ig5 is clipped to an image Ig6 of a size that can be displayed on the display 18 afterward.

<1-3. Indicator Overlapping Process>

Next, an indicator overlapping process will be explained. The indicator overlapping process is executed by the image display system Sy in the above-described surrounding monitoring mode when an object is detected by one of the sonars 21 to 26.

Figure 6:
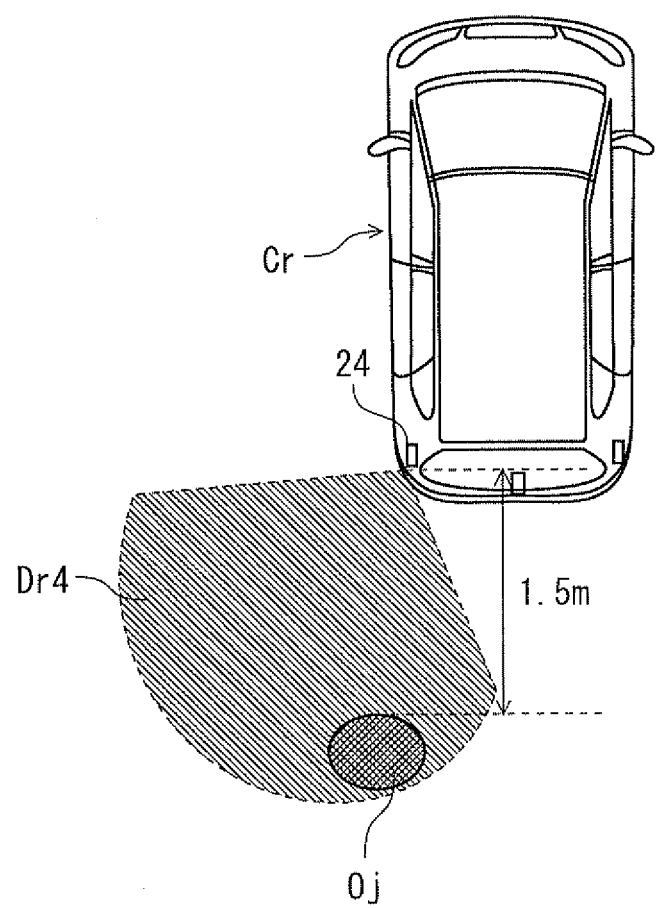
FIG. 6 is a diagram illustrating an example of a vehicle viewed from above according to the first embodiment.

FIG. 6 is a diagram illustrating the vehicle Cr which is viewed from above. In FIG. 6, an object Oj exists at a rear location of a left side of the vehicle Cr. If the object Oj exists at the rear location of the left side of the vehicle Cr, the object detecting apparatus 20 detects the object Oj based on a signal regarding ultrasonic waves obtained from the fourth sonar 24, and outputs a signal indicating the fourth sonar 24 and a signal indicating a distance (1.5 m) between the object and the fourth sonar 24 to the specifying unit 10.

The specifying unit 10 specifies that the fourth sonar 24 has detected the object Oj and also specifies the distance between the specified fourth sonar 24 and the object based on the obtained signals. Hereinafter, the specified sonar is referred to as a specific sonar and the specified distance is referred to as a specific distance. The indicator selection unit 9 selects an appropriate indicator by referring to map data shown in FIGS. 7 and 8, which are memorized in the non-volatile memory unit 5, based on the specific sonar and the specific distance.

Figure 8:
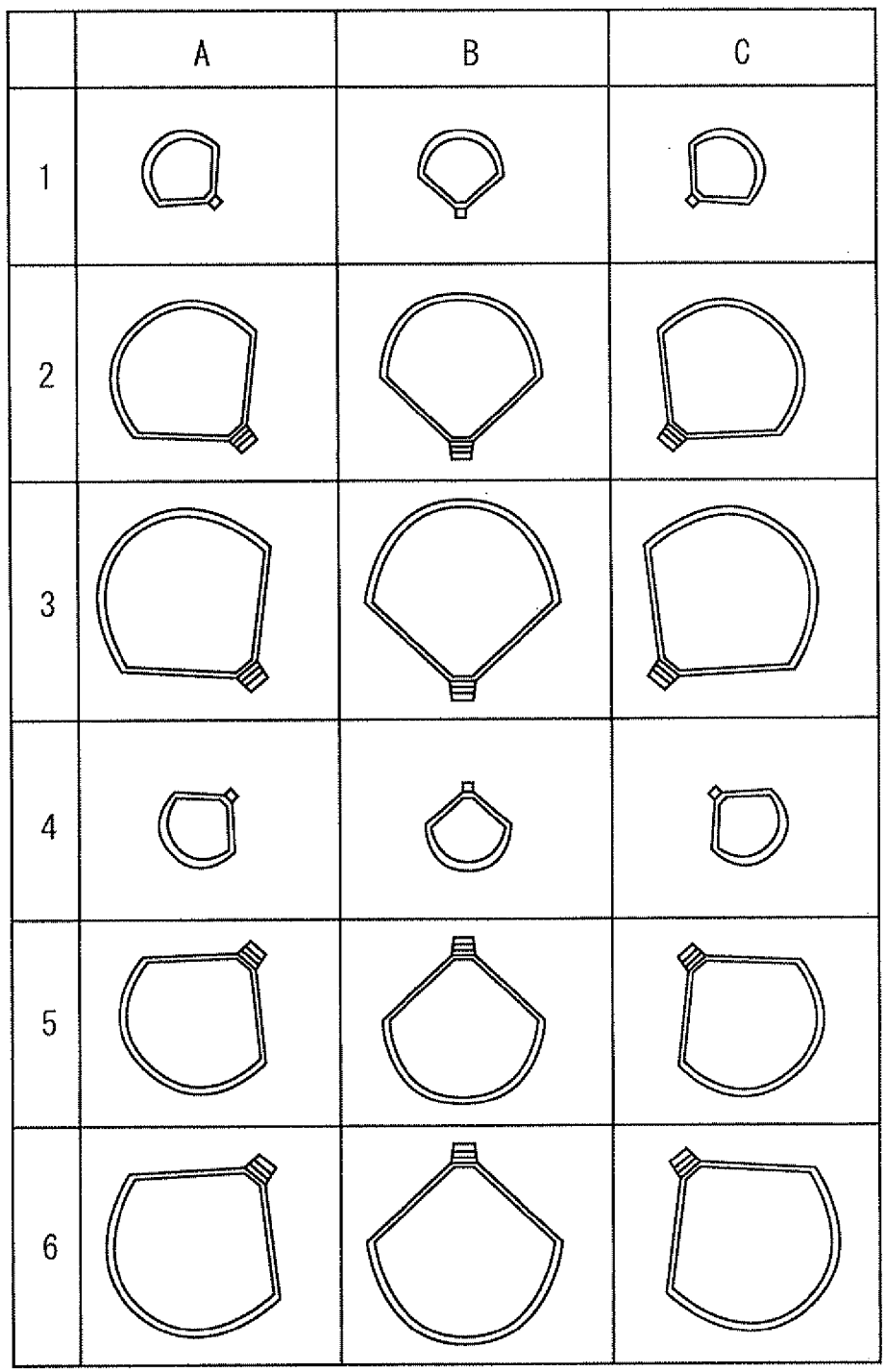
FIG. 8 is a diagram illustrating map data according to the first embodiment.

Specifically, if the map data shown in FIG. 7 is referred to based on specific sonar, the fourth sonar, and the specific distance, 1.5 m, an indicator code AG is extracted, and, if the map data shown in FIG. 8 is referred to based on the indicator code A6, a form of a frame on line 6 of column A is selected.

The map data shown in FIG. 7 is configured so that an indicator code corresponding to a specific sonar or a specific distance is selected. The map data of FIG. 8, which is selected based on the indicator code, is configured so that a form of a frame corresponding to the specific sonar or the specific distance is eventually selected. That is, the map data shown in FIGS. 7 and 8 are configured so that a form of a frame corresponding to a mounting position of a specific sonar is selected and also a form of a frame of a size corresponding to a specific distance is selected.

A signal of the indicator Id selected in this way is output to the indicator overlapping unit 8 by the indicator selection unit 9. The indicator overlapping unit 8 overlaps the indicator Id indicated by the input signal with the synthetic image.

Figure 9:
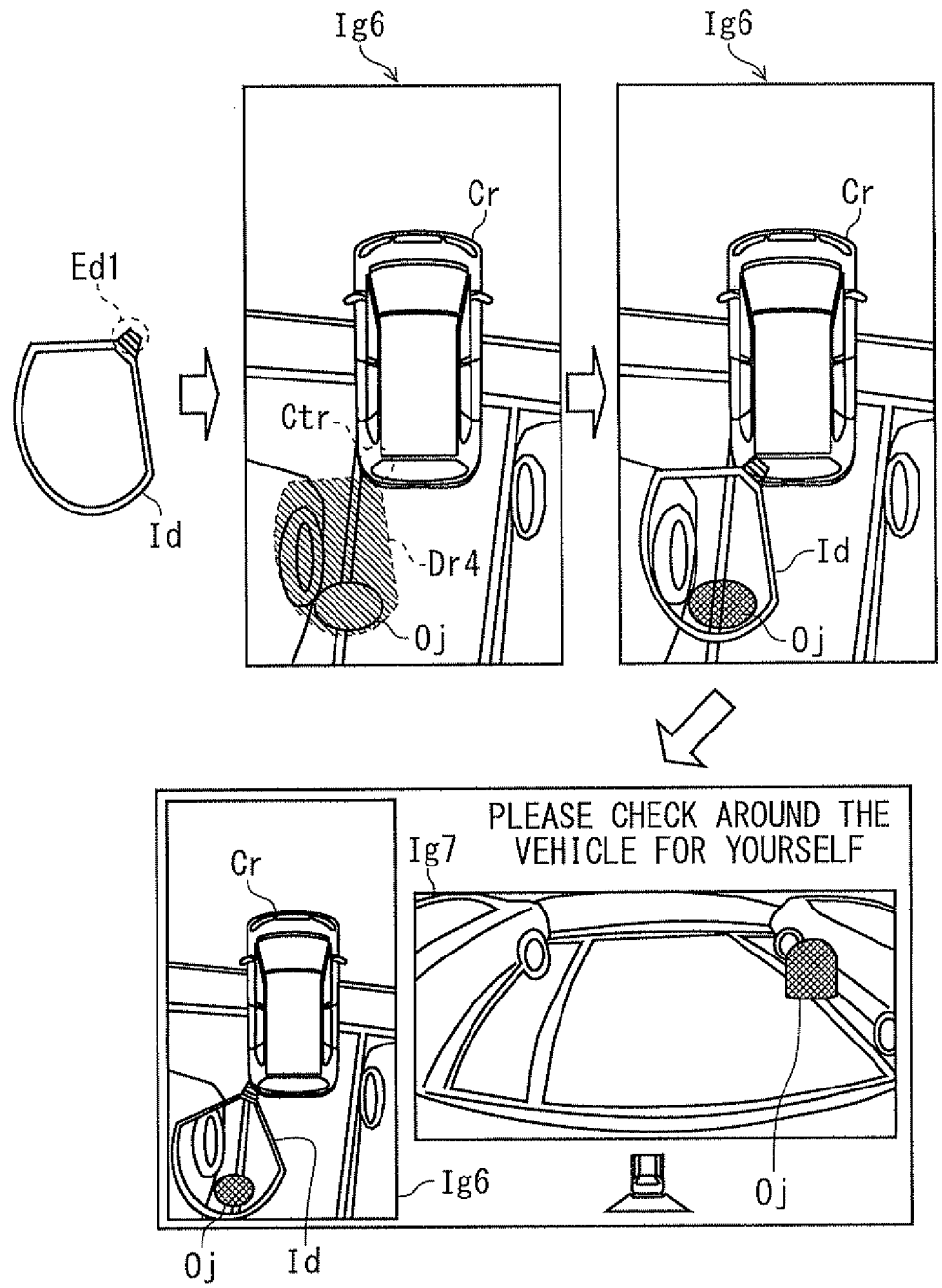
FIG. 9 is a diagram to explain a method for overlapping an indicator with an image according to the first embodiment.

FIG. 9 is a diagram to explain a method for overlapping the indicator Id with the synthetic image Ig6. That is, the indicator Id is overlapped with the synthetic image Ig6 (shown on the right of the upper drawings of FIG. 9) so that a rectangular portion Ed1 (shown on the left of the upper drawings of FIG. 9) of the indicator Id is overlapped with a position in the proximity to a left corner Cnr of a rear side of an image of the vehicle Cr of the synthetic image Ig6 (shown on the center of the upper drawings of FIG. 9), at least part of the object is located within the indicator Id represented in the form of a frame, and an arc portion of a sector form of the indicator Id is oriented to an outside of the vehicle Cr. A set image which includes the overlapped synthetic image Ig6 and an image Ig7 photographed by the rear camera 14 as a set is displayed on the display 18 (shown in the lower drawings of FIG. 9). That is, the set images is output to the output unit 6 by the indicator overlapping unit 8 and is output to the display apparatus 17 by the output unit 6. The set image is displayed on the display 18 included in the display apparatus 17.

Figure 10:
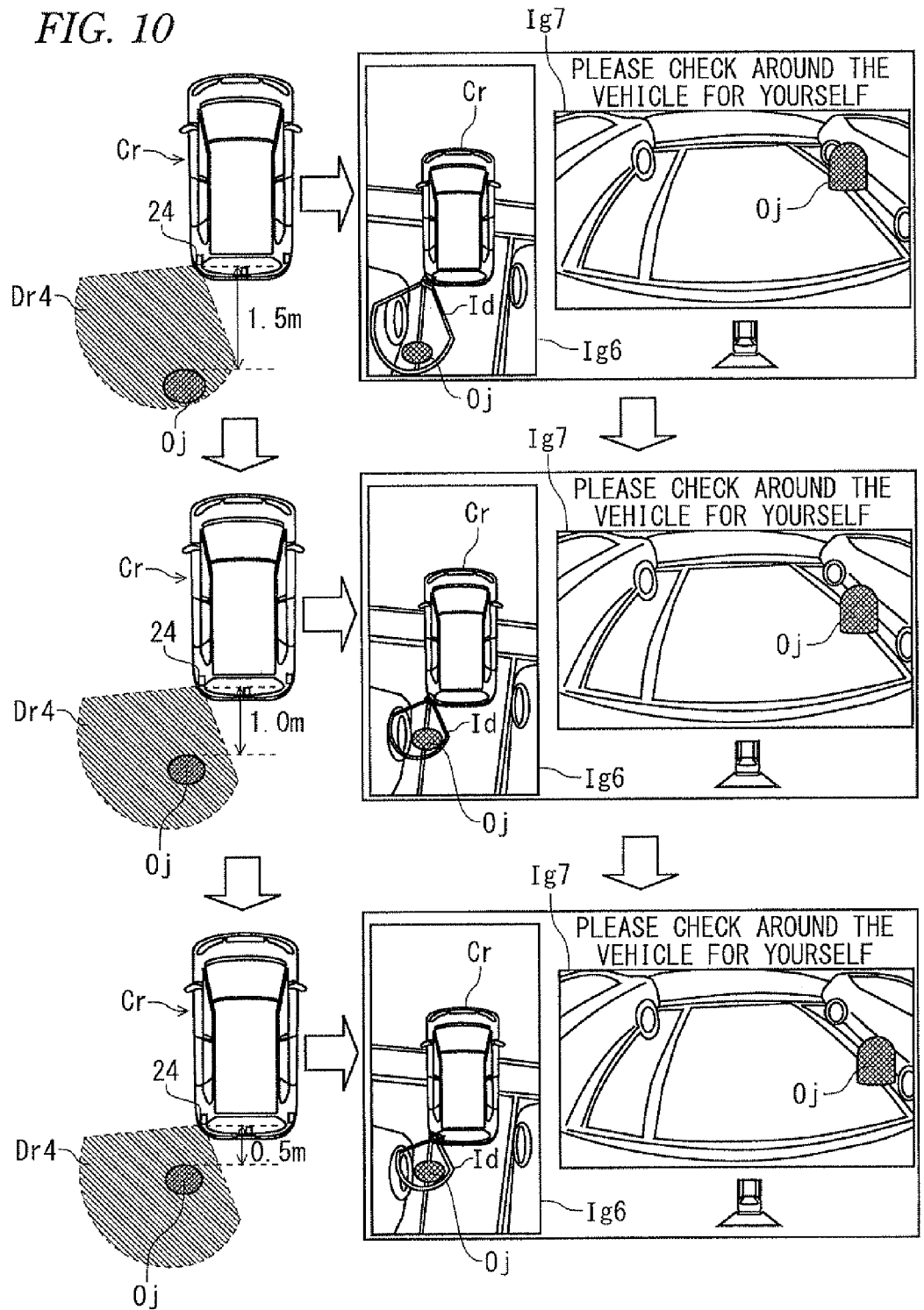
FIG. 10 is a diagram illustrating examples of an image overlapped with an indicator according to the first embodiment.

According to the indicator overlapping process described above, if the fourth sonar 24 detects an object Oj that exists relatively far away from the left corner of the rear side of the vehicle Cr (for example, 1.5 m) (shown on the left of the upper drawings of FIG. 10) as shown in FIG. 10, a relatively larger indicator (shown on the right of the upper drawings of FIG. 10) including the object Oj is displayed. Also, if the fourth sonar 24 detects an object Oj that exists relatively close to an outside of the left corner of the rear side of the vehicle Cr (for example, 1.0 m) (shown on the left of the middle drawings of FIG. 10), a relatively small indicator (shown on the right of the middle drawings of FIG. 10) including the object Oj is displayed. Also, if the fourth sonar 24 detects an object Oj that exists very close to the outside of the left corner of the rear side of the vehicle Cr (for example, 0.5 m) (shown on the left of the lower drawings of FIG. 10), a very small indicator (shown on the right of the lower drawings of FIG. 10) including the object Oj is displayed.

As such, in the image Ig7 of the vehicle Cr on the display 18 which is viewed from above, the object Oj is clearly displayed within the indicator Id indicating the specific sonar that has detected the object from among the sonars 21 to 26 and the object, and presented in the form of the frame. That is, the indicator Id represented in the form of the frame having the transparent inside is displayed enclosing the object Oj, so that the indicator Id is not overlapped with the object Oj and the user can exactly recognize the object Oj in the image Ig7 of the vehicle Cr on the display 18 which is viewed from above and also can exactly recognize the location and the direction of the object Oj.

Since the size of the indicator Id is changeable according to the specific distance, the user can sensuously recognize a distance between the object and the vehicle with the object detecting apparatus in the image Ig7 which is viewed from above the vehicle Cr on the display 18.

<1-4. Control Flow>

Figure 11:
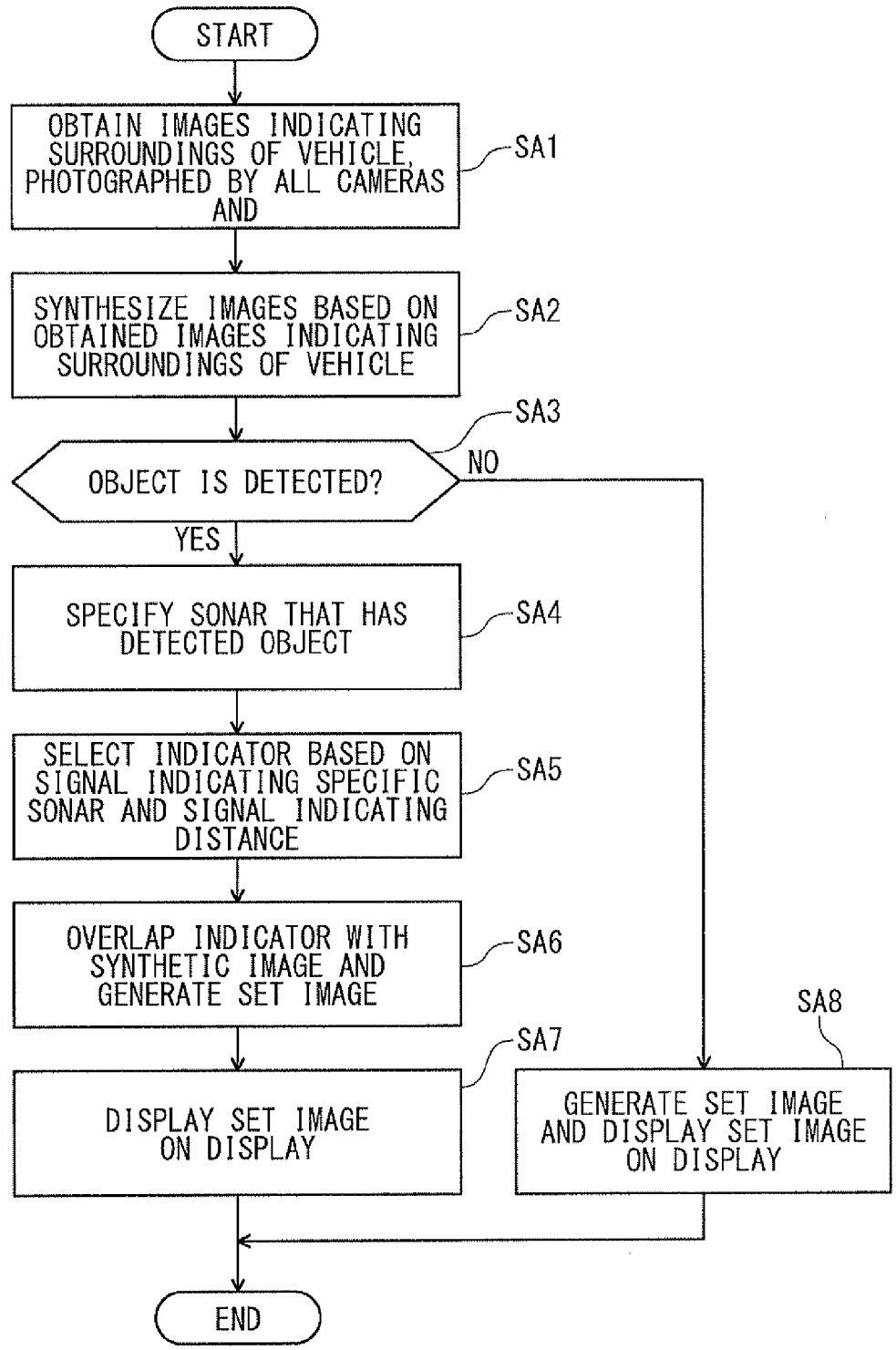
FIG. 11 is a flowchart illustrating a process of the image display system according to the first embodiment.

FIG. 11 is a flowchart illustrating a process of the image display system Sr. The process illustrated in FIG. 11 is repeated at a predetermined interval (for example, at an interval of 1/30 seconds) in a surrounding monitoring mode.

The obtaining unit 2 obtains images photographed by the cameras 11 to 14 (step SA1). The images show surroundings of a vehicle Cr.

The synthetic image generation unit 7 executes the above-described synthetic image generating process based on the obtained plurality of images indicating the surroundings of the vehicle Cr (step SA2). By this process, a synthetic image of the vehicle Cr which is viewed from above is obtained.

The sonars 21 to 26 output ultrasonic waves and receive the ultrasonic waves colliding with various objects and reflected from them, and output signals regarding the received ultrasonic waves to the object detecting apparatus 20. The object detecting apparatus 20 determines whether one of the sonars 21 to 26 has detected an object Oj or not based on the input signal regarding the ultrasonic waves (step SA3)

If one of the sonars 21 to 26 has detected the object (YES at step SA3), the specifying unit 10 specifies which sonar has detected the object (step SA4). That is, the object detecting apparatus 20 outputs a signal indicating the sonar that has detected the object and a signal indicating a distance between the sonar that has detected the object and the object to the specifying unit 10. The specifying unit 10 specifies the sonar that has detected the object and specifies the distance between the sonar that has detected the object and the object based on the input signals. The specifying unit 20 outputs the signal indicating the specific sonar and the signal indicating the specific distance to the indicator selection unit 9.

The indicator selection unit 9 selects an indicator Id based on the signal indicating the specific sonar and the signal indicating the specific distance (step SA5). That is, the indicator selection unit 9 selects an appropriate indicator Id by referring to the map data memorized in the non-volatile memory unit 5 based on the signal indicating the specific sonar and the signal indicating the specific distance. Accordingly, an indicator Id corresponding to a mounting position of the specific sonar is selected, and an indictor Id of a size corresponding to the specific distance is selected. The indicator selection unit 9 outputs a signal indicating the indicator Id to the indicator overlapping unit 8.

The indicator overlapping portion 8 overlaps the indicator Id indicated by the input signal with the synthetic image input from the synthetic image generation unit 7 at an appropriate position (step SA6). The indicator overlapping unit 8 outputs a set image including the overlapped synthetic image and an image photographed by the rear camera 14 as a set to the output unit 6, and the output unit 6 outputs the image to the display apparatus 17.

The display apparatus 17 displays the input set image on the display 18 (step SA7). Accordingly, the image overlapped with the indicator Id and indicating the surroundings of the vehicles Cr is displayed on the display 18.

If neither of the sonars 21 to 26 has detected the object Oj (NO at step SA3), the output unit 6 outputs a set image including the synthetic image without being overlapped with the indicator Id and the image photographed by the rear camera 14 as a set to the display apparatus 17. The display apparatus 17 displays the input set image on the display 18 (step SA8).

As described above, the image display system Sy according to the present embodiment clearly displays the object Oj within the indictor Id, which is represented in the form of the frame in the proximity to the specific sonar which has detected the object from among the sonars 21 to 26, in the image Ig7 of the vehicle Cr on the display 18 which is viewed from above. That is, the indicator Id which is represented in the form of the frame in the proximity to the specific sonar is displayed enclosing the object Oj, so that the object Oj is clearly displayed within the indicator Id represented in the form of the frame, the user can exactly recognize the object Oj in the image Ig7 of the vehicle Cr on the display 18 which is viewed from above, and also can exactly recognize the location and the direction of the object Oj. As a result, it is possible to support driving so that the user can notice that the object exists around the vehicle Cr and can avoid contact with the object.

Also, since the size of the indicator Id overlapped with the image displayed on the display 18 is changeable according to the specific distance, the user who views the display 18 can sensuously recognize the distance between the object Oj and the vehicle including the sonar.

2. Second Embodiment

Hereinafter, the second embodiment will be explained. If one of the sonars 21 to 26 detects an object, the image display system Sy according to the first embodiment displays an indicator indicating the sonar which has detected the object and the object and represented in the form of a frame. In comparison, if a plurality of sonars detect an object, the image display system Sy according to the second embodiment displays an indicator indicating the plurality of sonars and the object and represented in the form of a single frame.

Since the configuration and the process of the image display system Sy of the second embodiment are substantially the same as those of the first embodiment, a different point from the first embodiment will be mainly described.

<2-1. Indicator Overlapping Process>

First, an indicator overlapping process will be explained. The indicator overlapping process is executed in the above-described surrounding monitoring mode and is executed by the image display system Sy when one of the sonars 21 to 26 detects an object Oj.

Figure 12:
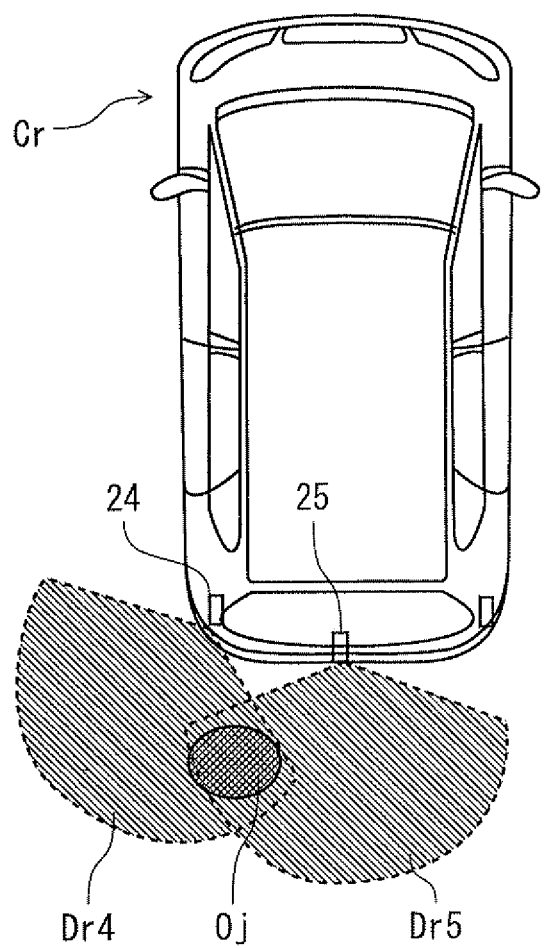
FIG. 12 is a diagram illustrating an example of a vehicle viewed from above according to a second embodiment.

FIG. 12 is a diagram illustrating a vehicle Cr which is viewed from above. In FIG. 12, an object Oj exists approximately at a center of a rear location of a left side of the vehicle Cr. If the object Oj exists approximately at the center of the rear location of the left side of the vehicle Cr in this way, the image display system Sy detects the object Oj with both the fourth sonar 24 and the fifth sonar 25. That is, the object detecting apparatus 20 detects the object Oj based on a signal regarding ultrasonic waves obtained from the fourth sonar 24, and outputs a signal indicating the fourth sonar 24 and a signal indicating a distance (1.5 m) between the object Oj and the fourth sonar 24 to the specifying unit 10. Also, the object detecting apparatus 20 detects the object Oj based on a signal regarding ultrasonic waves obtained from the fifth sonar 25, and outputs a signal indicating the fifth sonar 25 and a distance (1.5 m) between the object Oj and the fifth sonar 25 to the specifying unit 10.

The specifying unit 10 specifies that both the fourth sonar 24 and the fifth sonar 25 have detected the object Oj and specifies the distances between those specific sonars and the object Oj based on the obtained signals. The indicator selection unit 9 selects an appropriate indicator by referring to map data of FIGS. 13 and 14, which are memorized in the non-volatile memory unit 5, based on the specific sonars and the specific distances.

Figure 14:
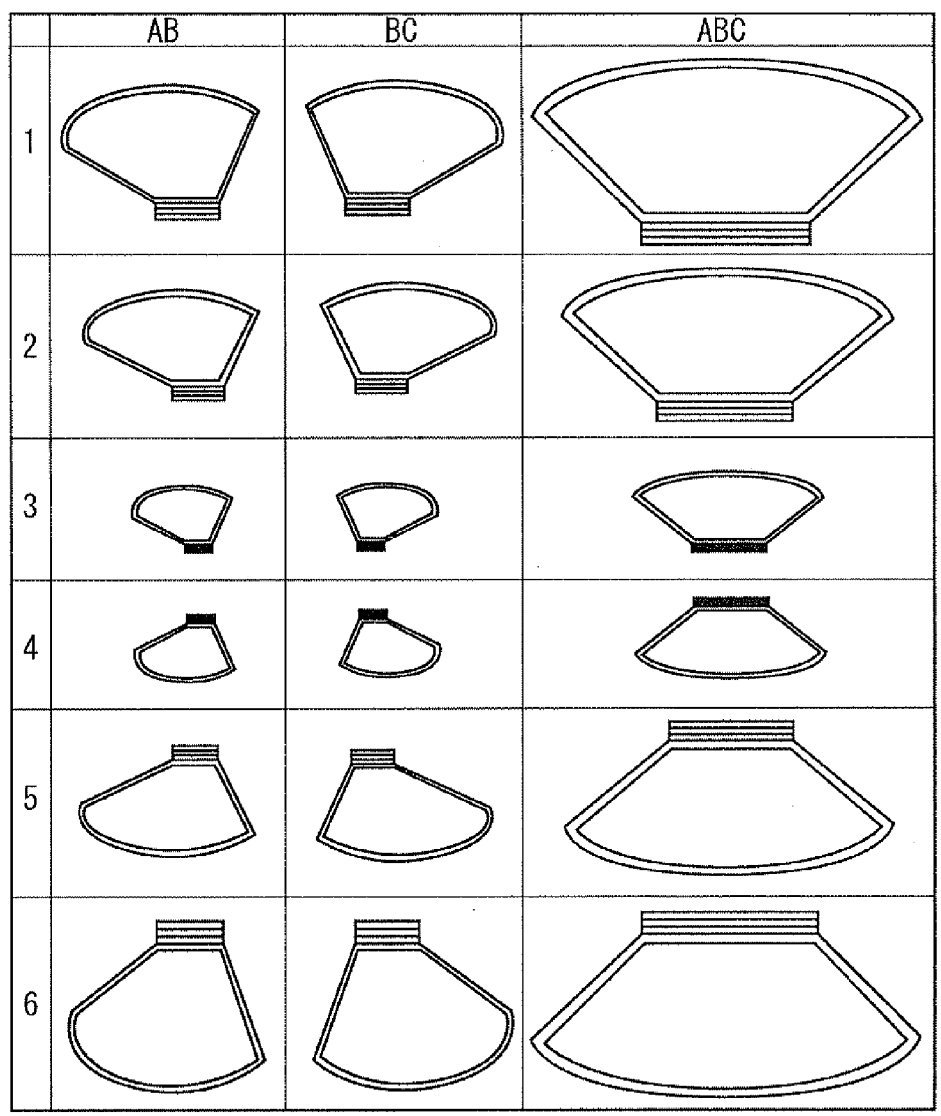
FIG. 14 is a diagram illustrating map data according to the second embodiment.

That is, if the map data of FIG. 13 is referred to based on the specific sonars, that is, the fourth sonar and the fifth sonar, and the specific distance, that is, 1.5 m, a specific indicator code AB6 is extracted, and, if the map data of FIG. 14 is referred to based on the specific indicator code AB6, a form of a frame on line 6 of column AB is selected.

The map data shown in FIG. 13 is configured so that a specific indicator code corresponding to a specific sonar or a specific distance is selected. The map data shown in FIG. 14, which is selected based on the specific indicator code, is configured so that a form of a frame corresponding to the specific sonar or the specific distance is eventually selected. That is, the map data shown in FIGS. 13 and 14 are configured so that a form of a frame corresponding to a mounting position of a specific sonar is selected and also a form of a frame of a size corresponding to a specific distance is selected. If a plurality of sonars are specified, an indicator indicating the plurality of specific sonars and an object and represented in the form of a single frame is selected based on the map data shown in FIGS. 13 and 14. A range of this indicator approximately corresponds to a whole area combining all detecting ranges of the plurality of specific sonars. A signal indicating the specific indicator Id selected in this way is output to the indicator overlapping unit 8 by the indicator selection unit 9. The indicator overlapping unit 8 overlaps the specific indicator Id indicated by the input signal with a synthetic image.

Figure 15:
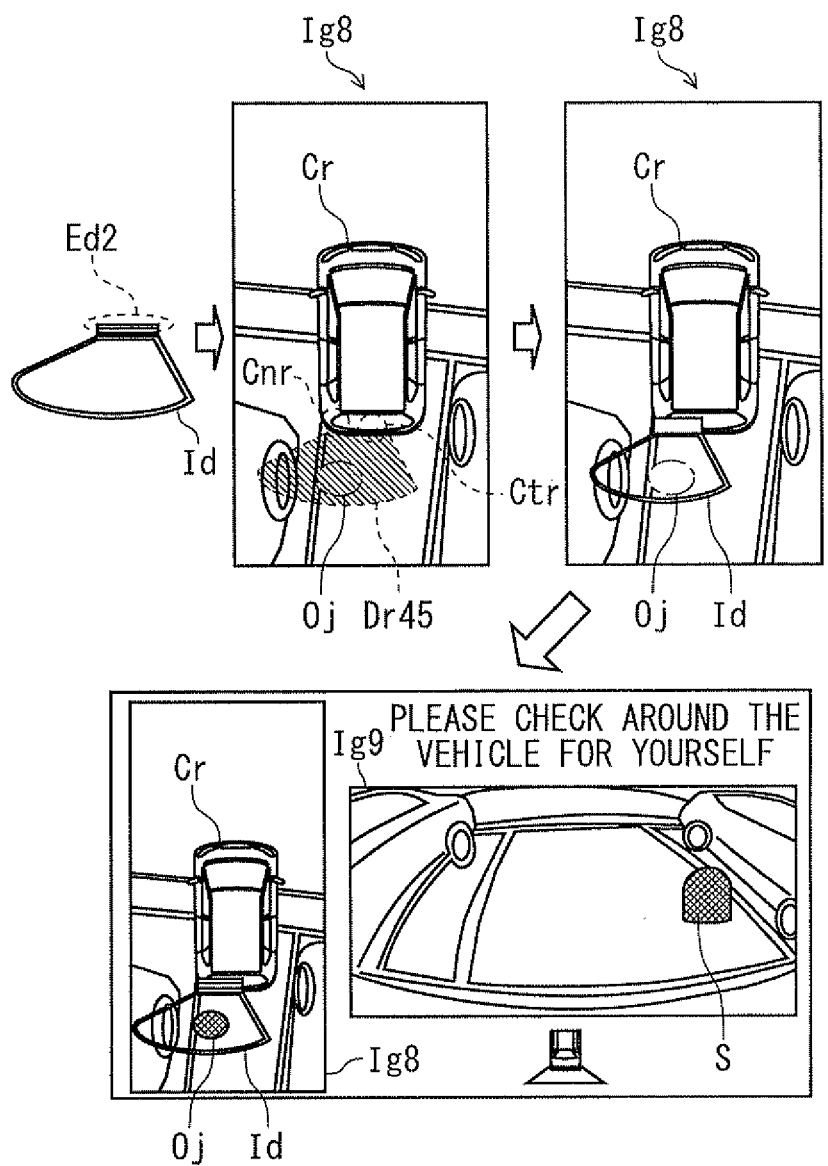
FIG. 15 is a diagram to explain a method for overlapping an indicator with an image according to the second embodiment.

FIG. 15 is a diagram to explain a method for overlapping the specific indicator Id with a synthetic image Ig8. That is, the specific indicator Id is overlapped with the image Ig8 (shown on the right of the upper drawings of FIG. 15) by placing a rectangular portion Ed2 of the specific indicator Id (shown on the left of the upper drawings of FIG. 15) to overlap with a position in the proximity to a left corner Cnr of a rear side of an image of the vehicle Cr in the synthetic image Ig8 and a position of a center Ctr of a rear end of the image of the vehicle Cr (shown on the middle of the upper drawings of FIG. 15), placing at least part of the object within the specific indicator Id represented in the form of the frame, and making portions forming a sector form of the one specific indicator Id indicating the fourth sonar 24 and the fifth sonar 25 and the object in the image Ig8 consistent with each other. A set image including the overlapped image Ig8 and an image Ig9 photographed by the rear camera 14 as a set is displayed on the display 18 (shown on the lower drawing of FIG. 15). That is, the set image is output to the output unit 6 by the indicator overlapping unit 8 and is output to the display apparatus 17 by the output unit 6. The set image is displayed on the display 18 included in the display apparatus 17.

If indicators Id indicating the plurality of specific sonars which have detected the object Oj and the object Oj are overlapped with the image, respectively, the indicators Id may be overlapped with each other and also the object Oj may exist in the overlapped portion. As a result, the user may lose a location and a direction of the object Oj by being disturbed by the overlapped portion in the image on the display 18. However, as explained in the second embodiment, a single specific indicator Id indicating the plurality of specific sonars that have detected the object Oj and the object is overlapped with the image Ig7 so that the object Oj is clearly displayed within the single specific indicator Id. As a result, the user can exactly recognize the location and the direction of the object Oj in the image of the display 18.

<2-3. Control Flow>

Figure 16:
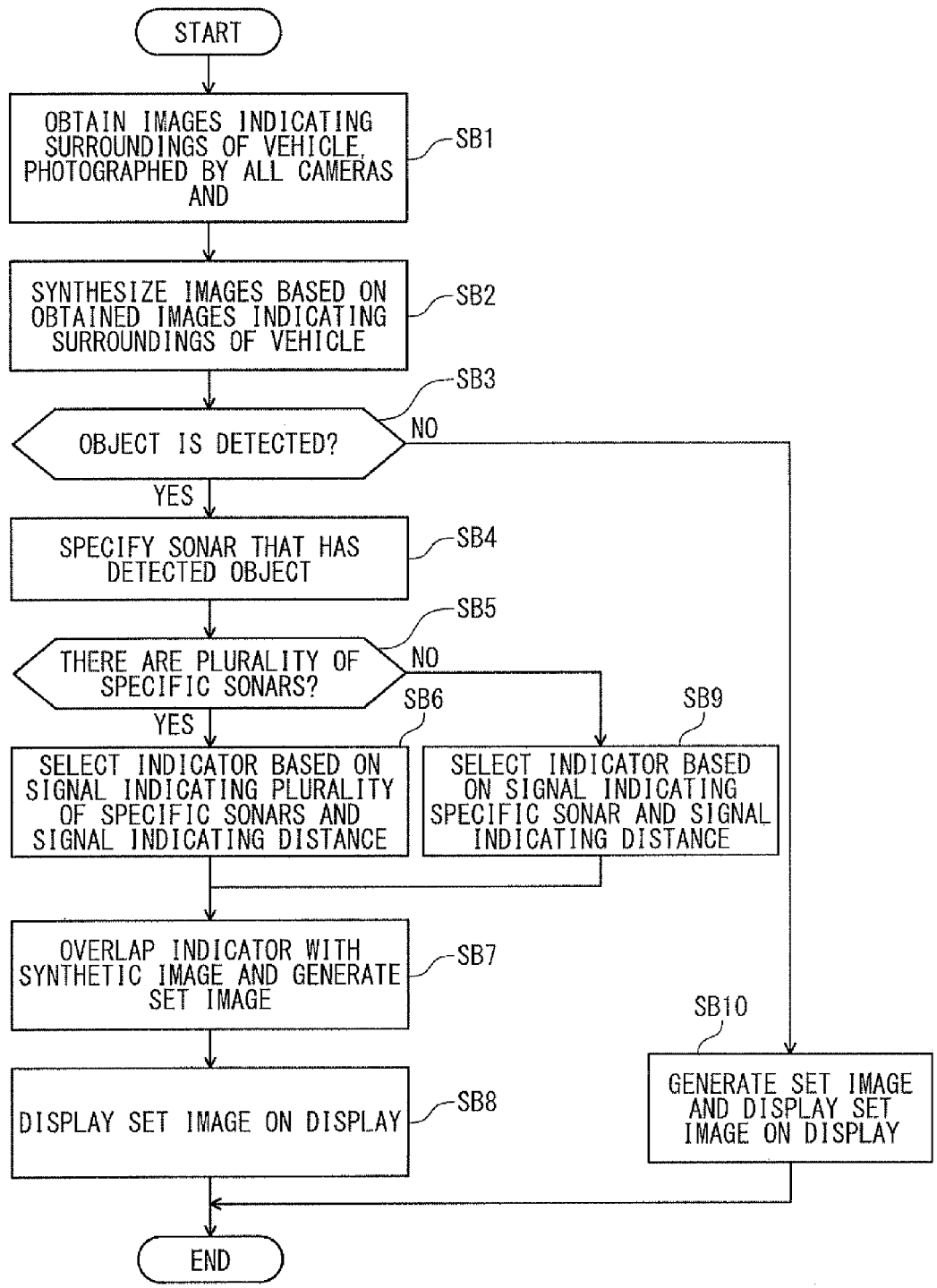
FIG. 16 is a flowchart illustrating a process of the image display system according to the second embodiment.

FIG. 16 is a flowchart illustrating a process of the image display system Sy. The process shown in FIG. 16 is repeated at a predetermined interval (for example, at an interval of 1/30 seconds) in a surrounding monitoring mode.

First, the obtaining unit 2 obtains images photographed by the cameras 11 to 14 (step SB1). The images show surrounding of a vehicle Cr.

The synthetic image generation unit 7 executes the above-described synthetic image generating process based on the obtained plurality of images indicating the surroundings of the vehicle Cr (step SB2). By this process, an image of the vehicle Cr that is viewed from above is obtained.

The sonars 21 to 26 output ultrasonic waves and receive the ultrasonic waves colliding with various objects and reflected from them, and output signals regarding the ultrasonic waves to the image detecting apparatus 20. The object detecting apparatus 20 determines whether one of the sonars 21 to 26 has detected the object Oj or not based on the signal regarding the ultrasonic waves (step SB3).

If one of the sonars 21 to 26 has detected the object Oj (YES at step SB3), the specifying unit 10 specifies which of the sonars 21 to 26 has detected the object Oj (step SB4). That is, the object detecting apparatus 20 outputs a signal indicating the sonar that has detected the object Oj and a signal indicating a distance between the sonar that has detected the object Oj and the object Oj to the specifying unit 10. The specifying unit 10 specifies the sonar that has detected the object Oj and specifies the distance between the sonar that has detected the object Oj and the object Oj based on the input signals. The specifying unit 10 outputs the signal indicating the specific sonar and the signal indicating the specific distance to the indicator selection unit 9.

If it is determined that a plurality of sonars are specified based on the input signals (YES at step SB5), the indicator selection unit 9 selects a specific indicator Id based on the input signals (step SB6). That is, the indicator selection unit 9 selects an appropriate specific indicator Id by referring to the map data of FIGS. 13 and 14, which is memorized in the non-volatile memory unit 5, based on the signal indicating the plurality of specific sonars and the signal indicating the plurality of specific distances. Accordingly, a specific indicator Id corresponding to mounting positions of the plurality of specific sonars is selected, a single specific indicator Id indicating the plurality of specific sonars and the object is selected, and a specific indicator Id of a size corresponding to the specific distance is selected. The indicator selection unit 9 outputs a signal indicating the specific indicator Id to the indicator overlapping unit 8.

The indicator overlapping unit 8 overlaps the specific indicator Id indicated by the input signal with the synthetic image input from the synthetic image generation unit 7 at an appropriate position (step SB7). The indicator overlapping unit 8 outputs a set image including the overlapped synthetic image and an image photographed by the rear camera 14 as a set to the output unit 6, and the output unit 6 outputs the set image to the display apparatus 17.

The display apparatus 17 displays the input set image on the display 18 (step SB8). Accordingly, the image overlapped with the specific indicator Id and indicating the surroundings of the vehicle Cr is displayed on the display 18.

If neither of the sonars 21 to 26 have detected the object Oj (NO at step SB3), the output unit 6 outputs a set image including the synthetic image without being overlapped with the specific indicator Id and the image photographed by the camera 14 as a set to the display apparatus 17. The display apparatus 17 displays the input set image on the display 18 (step SB10).

If it is determined that a single sonar is specified based on the input signals (NO at step SB5), the indicator selection unit 9 selects an indicator Id based on the input signal (step SB9). That is, the indicator selection unit 9 selects an appropriate indicator Id by referring to the map data of FIGS. 7 and 8, which are memorized in the non-volatile memory unit 5, based on the signal indicating the single sonar and the signal indicating the specific distance. Accordingly, an indicator Id corresponding to a mounting position of the specific sonar is selected and an indicator Id of a size corresponding to the specific distance is selected. The indicator selection unit 9 outputs a signal indicating the selected indicator Id to the indicator overlapping unit 8.

As described above, if the object Oj is detected by a plurality of adjacent sonars, since the specific indicator Id indicates the plurality of sonars that have detected the object Oj and the object and also is represented in the form of a single frame with a transparent inside, the object Oj is clearly displayed within the single specific indicator Id. As a result, the user can exactly recognize the location and the direction of the object Oj in the image of the display 18.

In the first and the second embodiments, the synthetic image of the vehicle Cr that is viewed from above is generated by synthesizing the images photographed by the cameras 11 to 14 and indicating the surroundings of the vehicle Cr, and the indicator Id is overlapped with the synthetic image. However, the indicator Id may be overlapped with the images photographed by the cameras 11 to 14, respectively, and indicating the surroundings of the vehicle Cr rather than the synthetic image.

Figure 17:
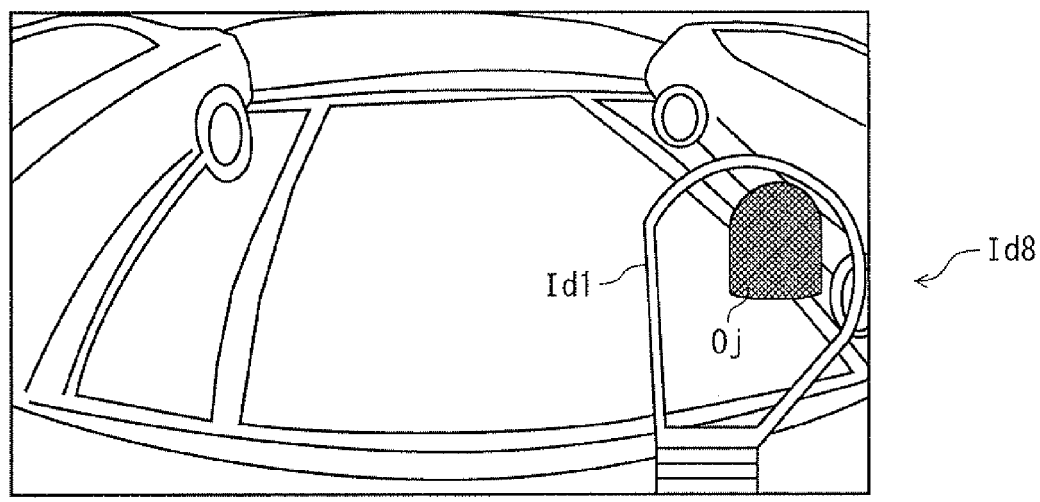
FIG. 17 is a diagram illustrating an example of an image photographed by a rear camera and indicating rear surroundings of a vehicle according to the second embodiment.

For example, the indicator Id may be overlapped with an image photographed by the rear camera 14 and indicating rear surroundings of the vehicle Cr, as shown in FIG. 17. In this case, the shape of the indicator Id is changed according to the mounting position of the specific sonar that has detected the object Oj and the size of the indicator Id is changed according to the specific distance.

Third Embodiment

The third embodiment will be explained hereinafter. In the first and the second embodiments, the image display system Sy displays the indicator Id indicating the sonar that has detected the object Oj and the object Oj and represented in the form of the frame along with the image, so that the user can notice the location and the direction of the object Oj around the vehicle Cr and can avoid contact with the object Oj.

In comparison, the image display system Sy in the third embodiment displays a line of a driving trajectory extracted based on a current steering angle. If a steering angle reaches a maximum, a length of this line is displayed as a length corresponding to a distance of the driving trajectory from an end at an advancing direction side to a position where an extending direction of the driving trajectory is perpendicular to a forward-backward direction of the vehicle Cr, so that driving of a user who parks a vehicle Cr in a parking space can be supported.

Recently, an image display system that supports driving of a user who parks a vehicle Cr in a parking space by displaying an image indicating surroundings of the vehicle Cr along with a line indicating a driving trajectory of the vehicle Cr, which is predicted based on a current steering angle of steering, on the display 18 in the vehicle, has been suggested. However, when the user controls the end of the vehicle Cr at the advancing direction side of the displayed line to be fitted in a width of the parking space by changing the steering angle by manipulating the steering, if a length of the line is relatively short, it may be difficult to control because of a considerable distance between the end and the width. On the other hand, if the length of the line is relatively long, it may be also difficult to control because the end is located beyond the width of the parking space. As a result, there is a problem that the driving of the user who parks the vehicle Cr in the parking space is not appropriately supported.

As such, a technology of adjusting the line of the driving trajectory to have a length to fit the end in the width of the parking space and thus appropriately supporting the user who parks the vehicle Cr in the parking space will be explained.

Figure 18:
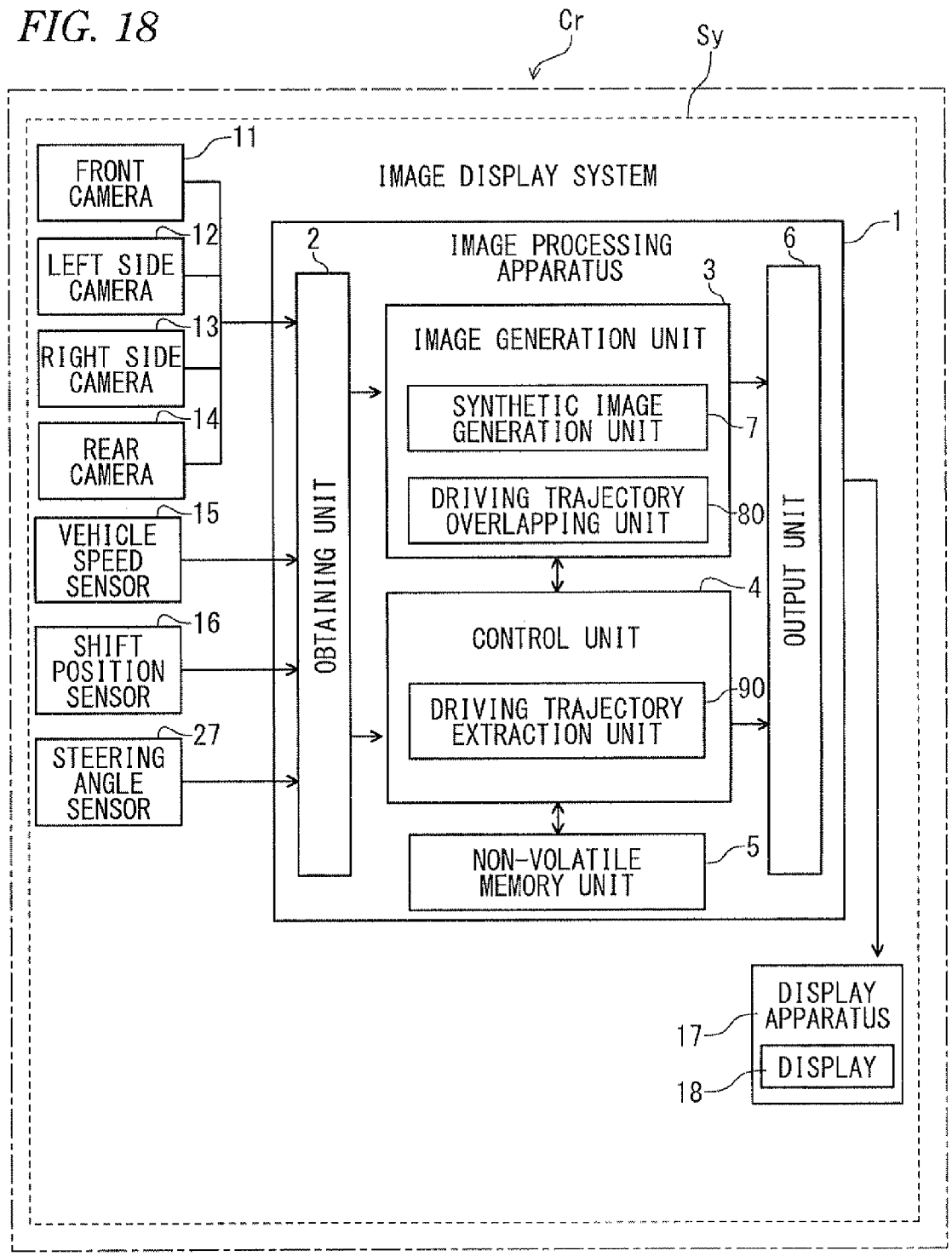
FIG. 18 is a diagram illustrating a configuration of a parking control system according to a third embodiment.

Since the configuration of the image display system Sy of the third embodiment is substantially the same as that of the first embodiment, a different point from the first embodiment will be mainly explained. FIG. 18 is a diagram illustrating a configuration of a parking control system Sy according to the third embodiment. The parking control system Sy according to the third embodiment includes a driving trajectory overlapping unit 80 instead of the indicator overlapping unit 8. Also, the parking control system Sy includes a driving trajectory extraction unit 90 instead of the indicator selection unit 9. Also, the image display system Sy further includes an steering angle sensor 27. The image display system Sy does not include the specifying unit 10, the object detecting apparatus 20, and the sonars 21 to 26.

The steering angle sensor 27 is disposed in the proximity to a rotation shaft of the steering and senses a rotation angle when the steering is manipulated by the user. The driving trajectory extraction unit 90 extracts a trajectory (driving trajectory) which is predicted if the vehicle Cr is driven with the steering angle of the manipulated steering. The driving trajectory overlapping unit 80 overlaps the extracted driving trajectory with a synthetic image.

<3-1. Driving Trajectory Extracting Process>

A driving trajectory extracting process executed by the driving trajectory extraction unit 90 will be explained first. The driving trajectory extracting process is executed if a shift position is 'R'. Specifically, a signal regarding a shift position is obtained from the shift position sensor 16, and, if it is determined that the shift position is 'R' based on the obtained signal, the driving trajectory extraction unit 90 performs the driving trajectory extracting process. Also, in this case, the synthetic image generation unit 7 executes the image synthesizing process. That is, in this case, the image display system Sy enters a parking mode of the vehicle Cr and performs the driving trajectory extracting process and the image synthesizing process, thereby displaying an image indicating surroundings of the vehicle Cr on the display 18.

Figure 19:
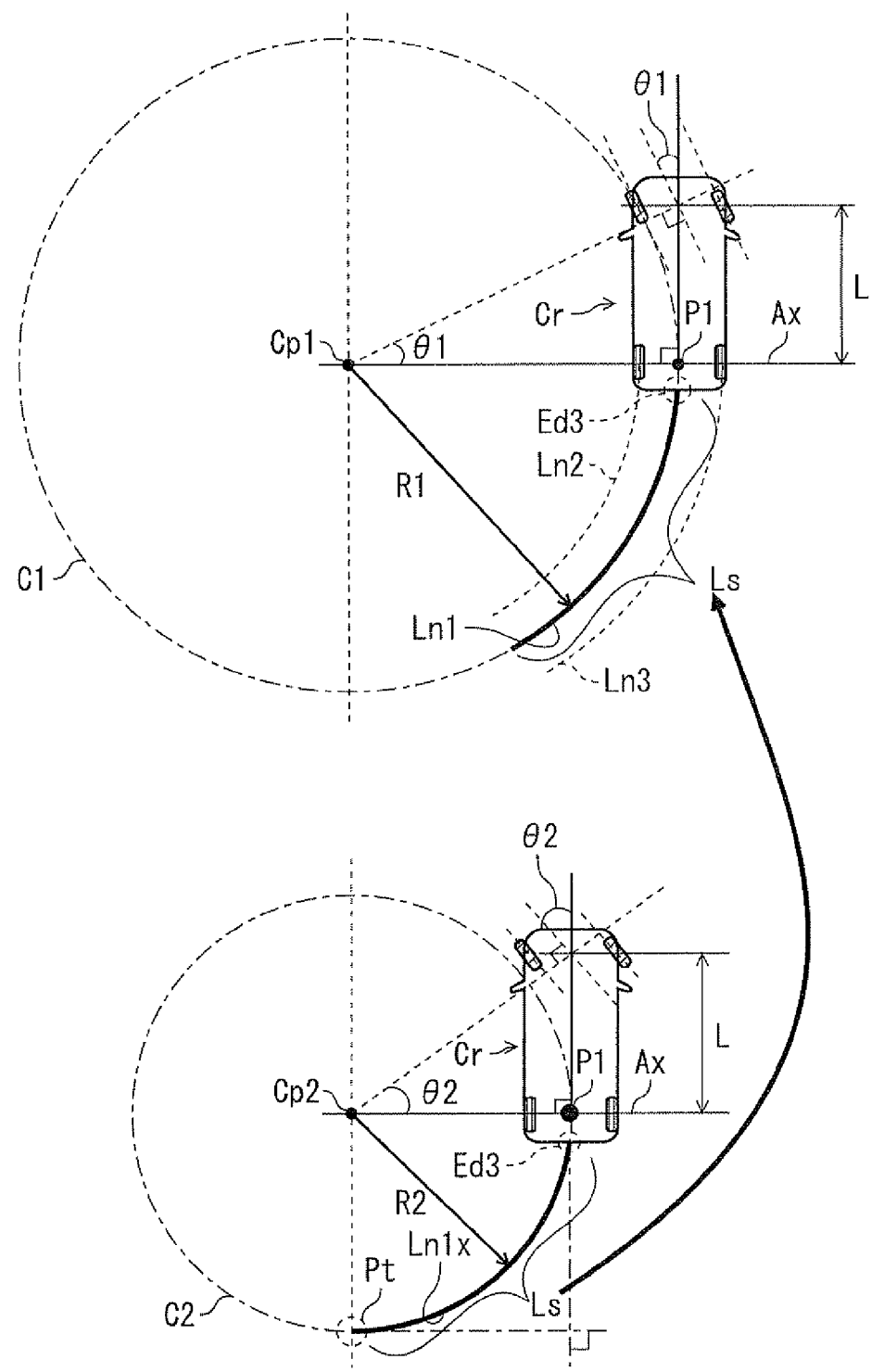
FIG. 19 is a diagram to explain extraction of a driving trajectory of a vehicle that is predicted if the vehicle is driven with a steering angle.

FIG. 19 is a diagram to explain a method for extracting a driving trajectory of the vehicle Cr which is predicted if the vehicle Cr is driven with a current steering angle $\theta1$. A position of this driving trajectory is noticed on a virtual map that is defined by two-dimensional coordinates which considers a position of a horizontal center or a vertical center of the vehicle Cr viewed from above as its origin. The driving trajectory may be extracted in various well-known methods, but one of the methods will be explained.

If the vehicle Cr is driven with a current steering angle $\theta1$, a circle C1 is drawn by a point P1 of a horizontal center of an axis As of a rear side of the vehicle Cr, as shown in the upper drawing of FIG. 19. The circle C1 is a circle that is drawn round a point Cp1 which exists on an extension of the axis As of the rear side of the vehicle Cr, and corresponds to a driving trajectory of the horizontal center of the vehicle Cr if the vehicle Cr is driven with the steering angle $\theta1$. A radius R1 of the circle C1 is calculated by following equation (1). 'L' in equation (1) denotes a length of a wheel base of the vehicle Cr.

$$R1 = L/\tan\theta1 \tag{1}$$

Next, a center line L111 is extracted by cutting off a line of a predetermined reference length Ls from the circle C1.

The reference length Ls is determined based on the maximum steering angle of the vehicle Cr. The lower drawing of FIG. 19 is a diagram to explain a method for extracting the reference length Ls. As shown in the lower drawing of FIG. 19, if the vehicle Cr is pivoted by a maximum steering angle θ2, a circle C2 is drawn by the point P1 of the horizontal center of the axis Ax. The circle C2 is a circle that is drawn round a point Cp2 existing on the extension of the axis Ax of the rear side of the vehicle Cr, and corresponds to a driving trajectory of the horizontal center of the vehicle Cr if the vehicle Cr is driven with the maximum steering angle θ2. A radius R2 of the circle C2 is calculated by following equation (2).

$$R2 = L/\tan\theta 2 \quad (2)$$

Based on the circle C2 which has the center Cp2 and the radius R2, a position Pt (hereinafter, referred to a specific position), which is distanced from a position of the axis Ax of the vehicle Cr as much as −90°, that is, where an extending direction of the circle C2 (a tangential direction) is perpendicular to a forward-backward direction of the vehicle Cr, is noticed. The specific position Pt is a position where the extending direction of the driving trajectory of the vehicle Cr is perpendicular to the forward-backward direction of the vehicle Cr. A line Ln1x, which follows the circle C2 and has both ends connected to a rear end Ed3 of the vehicle Cr (an end at the advancing direction side) and the specific position Pt, is noticed. If the steering angle reaches the maximum, a length of the line Ln1x indicates a distance of the driving trajectory from the end Ed3 of the vehicle Cr at the advancing direction side to the specific position Pt where the extending direction of the driving trajectory is perpendicular to the forward-backward direction of the vehicle Cr, and this length is determined as the reference length Ls.

The reference length Ls extracted based on the maximum steering angle θ2 is employed as a length of the center line Ln1 based on the current steering angle θ1. The reference length is extracted in advance and is memorized in a memory of the control unit 4. The driving trajectory extraction unit 90 extracts the center line Ln1 by cutting off the line of the reference length memorized in the memory from the circle C1.

Next, a line indicating the driving trajectory is extracted based on the center line Ln1. Specifically, as shown in the upper drawing of FIG. 19, the driving trajectory extraction unit 90 extracts a left rear wheel line Ln2 and a right rear wheel line Ln3 indicating driving trajectories of a left rear wheel and a right rear wheel of the vehicle Cr, respectively, in accordance with the center line Ln1. A ladder-shaped line is extracted based on the left rear wheel line Ln2 and the right rear wheel line Ln3.

Figure 20:
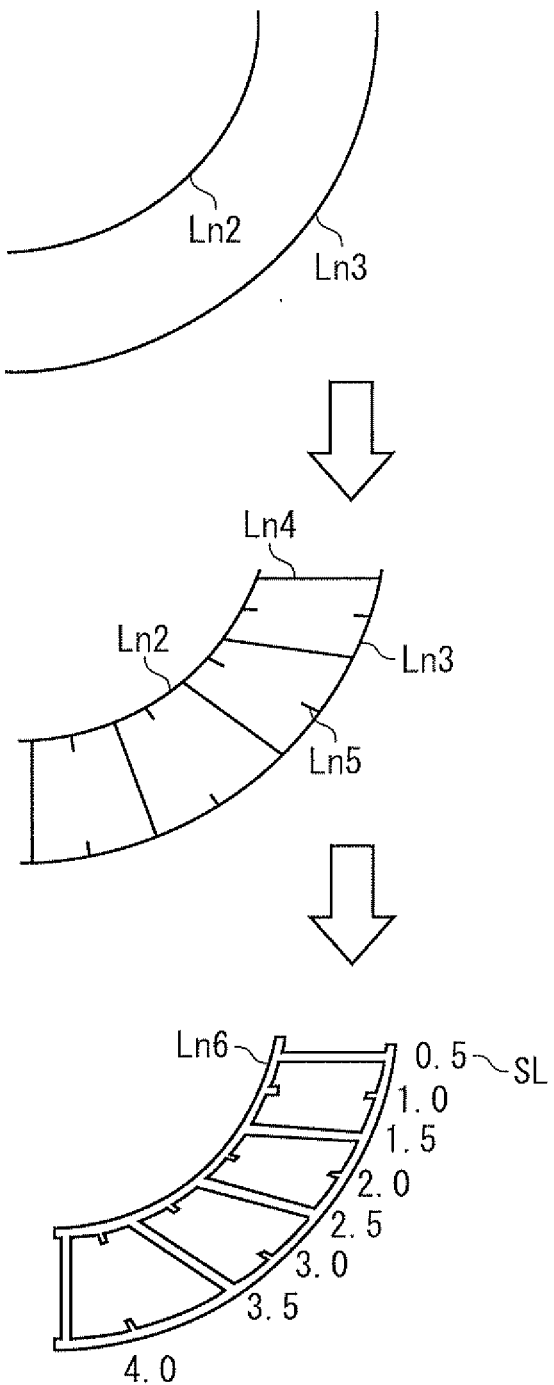
FIG. 20 is a diagram to explain extraction of a ladder-shaped line based on a left rear wheel line and a right rear wheel line according to the third embodiment.

FIG. 20 is a diagram to explain a method for extracting a ladder-shaped line based on the left rear wheel line Ln2 and the right rear wheel Line Ln3. The left rear wheel line Ln2 and the right rear wheel line Ln3 (shown in the upper drawing of FIG. 20) correspond to supporting portions of the ladder. A line Ln4 (shown in the middle drawing of FIG. 20) corresponding to a rung (horizontal line) of the ladder is drawn over the supporting portions at an equal interval (for example, at an interval of 1.0 m along a center line Ln6). A broken line Ln5 is drawn between the lines Ln4. A line Ln6 (shown in the lower drawing of FIG. 20) indicating the driving trajectory is drawn by giving a predetermined width (for example, 3 mm) to each of the lines Ln2 to Ln5.

A number indicating an actual distance from the rear end of the vehicle Cr to each of the lines Ln4 is added in the proximity of the line Ln4. A number indicating an actual distance from the rear end of the vehicle Cr to each of the lines Ln5 is added in the proximity of the line Ln5. The number functions as a scale S1.

According to the above-described driving trajectory extracting process, if the steering angle reaches the maximum, a length of the line Ln6 indicating the driving trajectory is set as the length (reference length) corresponding to the distance of the driving trajectory from the end Ed3 of the vehicle Cr at the advancing direction side to the specific position Pt where the extending direction of the driving line Ln6 is perpendicular to the forward-backward direction of the vehicle Cr, regardless of the current steering angle θ1.

<3-2. Driving Trajectory Overlapping Process>

Figure 21:
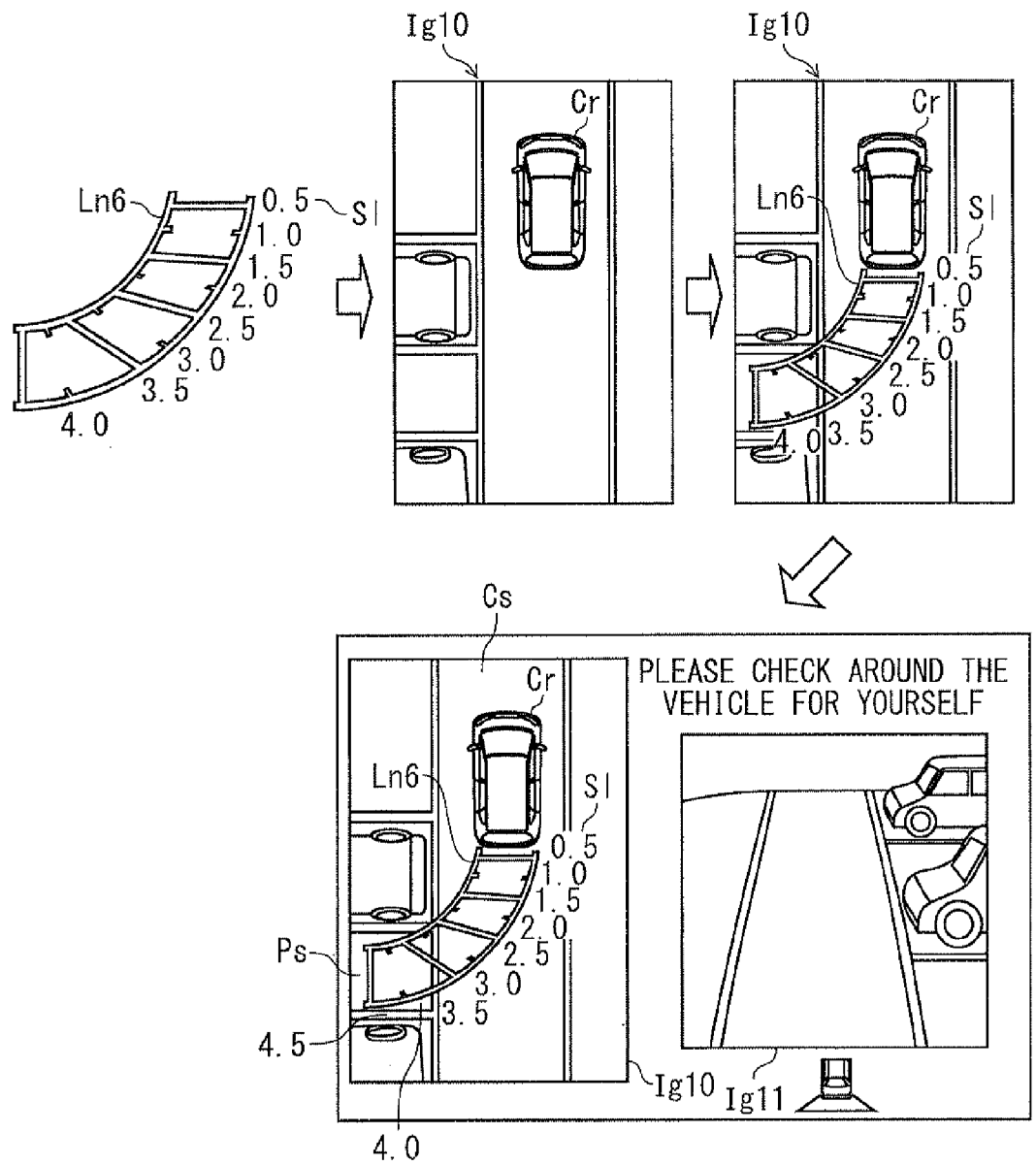
FIG. 21 is a diagram to explain a method for overlapping a line indicating a driving trajectory with an image indicating surroundings of a vehicle according to the third embodiment.

Next, a driving trajectory overlapping process executed by the driving trajectory overlapping unit 80 will be explained. FIG. 21 is a diagram to explain a method for overlapping the line Ln6 indicating the driving trajectory with an image indicating surroundings of the vehicle Cr. The extracted line Ln6 (shown on the left of the upper drawings of FIG. 21) is overlapped with a synthetic image Ig10 (shown on the middle of the upper drawings of FIG. 21) at an appropriate position. Specifically, in the synthetic image Ig10 of the vehicle Cr which is viewed from above, a virtual map defined by two-dimensional coordinates which consider a position of a horizontal center or a vertical center of the vehicle Cr as its origin is set. Also, a position of the line Ln6 on the virtual map is noticed as described above. That is, using the coordinates of the virtual map, the line Ln6 is overlapped at the appropriate position and the synthetic image Ig10 (shown on the right of the upper drawings of FIG. 21) is generated.

A set image including the overlapped synthetic image Ig10 and an image Ig11 photographed by the rear camera 14 as a set is displayed on the display 18 (shown on the lower drawing of FIG. 21). That is, the set image is output to the output unit 6 by the driving trajectory overlapping unit 80, and is output to the display apparatus 17 by the output unit 6. The set image is displayed on the display 18 included in the display apparatus 17.

Since the displayed length of the line Ln6 indicating the driving trajectory is set as the length (reference length) corresponding to the distance of the driving trajectory from the end of the vehicle Cr at the advancing direction side to the position where the extending direction of the driving trajectory is perpendicular to the forward-backward direction of the vehicle Cr regardless of the current steering angle, if the steering angle reaches the maximum, the driving of the user who parks the vehicle Cr in the parking space can be appropriately supported.

One of the parking methods that the user feels it most difficult to perform is maneuvering a vehicle into a garage. When maneuvering a vehicle into a garage, for example, the driver has to park the vehicle Cr in a parking space Ps, which is located substantially perpendicular to a position to which the vehicle Cr moves backward from a stop position by a predetermined distance (for example, 2 m) on a driving road Cs, as shown in the lower drawing of FIG. 21. Accordingly, if the length of the line Ln6 is set as described above and the steering is manipulated to the maximum at the stop position of the vehicle Cr, the end of the vehicle Cr at the advancing direction side on the line Ln6 can be appropriately fitted in the width of the parking space. As a result, the driving of the user who parks the vehicle Cr in the parking space can be appropriately supported.

Also, since the scale S1 is added to the line Ln6, the user can easily recognize a relative distance between the vehicle Cr and the parking space.

<3-3. Control Flow>

Figure 22:
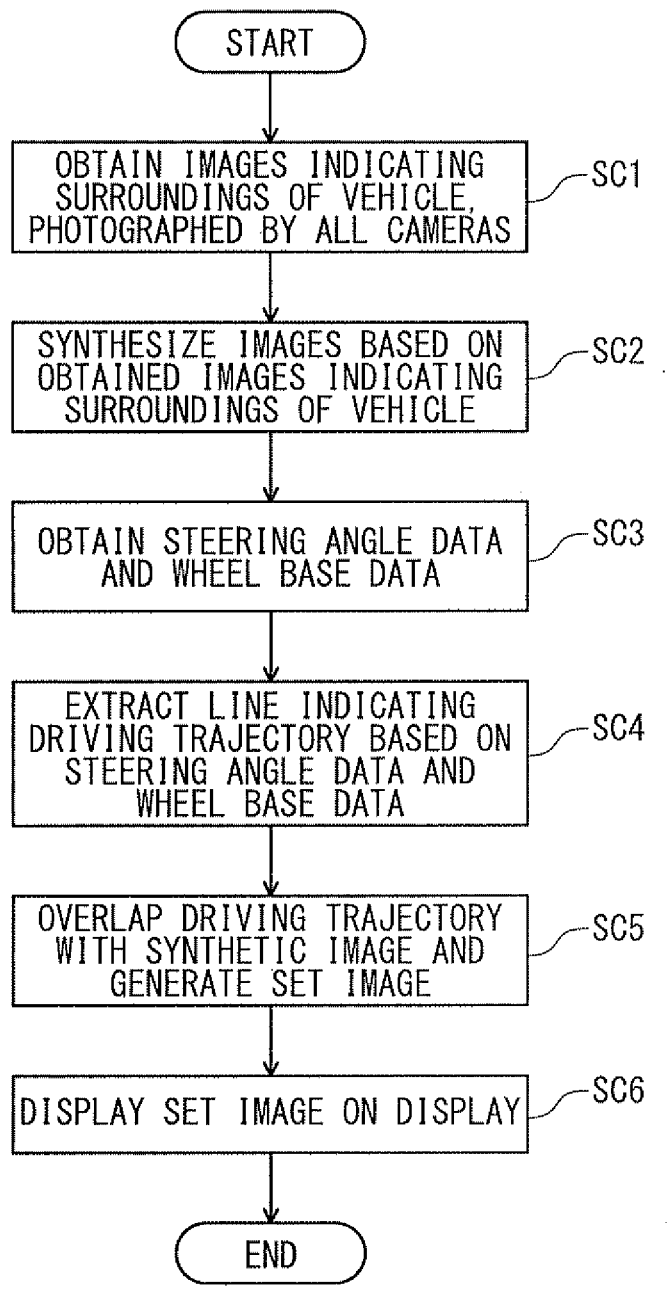
FIG. 22 is a flowchart illustrating a process of an image display system according to the third embodiment.

FIG. 22 is a flowchart illustrating a process of the image display system Sy. The process illustrated in FIG. 22 is repeated at a predetermined interval (for example, at an interval of 1/30 seconds) in a parking mode.

The obtaining unit 2 obtains images photographed by the cameras 11 to 14 (step SC1). The images show surroundings of a vehicle Cr.

The synthetic image generation unit 7 executes the above-described synthetic image generating process based on the plurality of images indicating the surroundings of the vehicle Cr (step SC2). By this process, an image of the vehicle Cr which is viewed from above is obtained.

The driving trajectory overlapping unit 80 obtains steering angle data and wheel base data (step SC3). That is, the driving trajectory overlapping unit 80 obtains current steering angle data extracted based on a signal regarding a steering angle input from the steering angle sensor 27, and obtains wheel base data of the vehicle Cr input from the non-volatile memory unit 5.

The driving trajectory extraction unit 90 extracts a line Ln6 indicating a driving trajectory based on the steering angle data and the wheel base data (step SC4). Also, a length of the line Ln6 indicating the driving trajectory is set as a reference length regardless of the current steering angle. The driving trajectory extraction unit 90 outputs the extracted line Ln6 indicating the driving trajectory to the driving trajectory overlapping unit 80.

Next, the driving trajectory overlapping unit 80 overlaps the line Ln6 indicating the driving trajectory with a synthetic image (step SC5). The driving trajectory overlapping unit 80 generates a set image including the overlapped synthetic image and an image photographed by the rear camera 14 as a set. The driving trajectory overlapping unit 80 outputs the set image to the output unit 6 and the output unit 6 outputs the set image to the display apparatus 17.

The display apparatus 17 displays the set image on the display 18 (step SC5).

As described above, since the length of the line Ln6 indicating the driving trajectory is set as a length (reference length) corresponding to the distance of the driving trajectory from the end of the vehicle Cr at the advancing direction side to the position where the extending direction of the line of the driving trajectory is perpendicular to the forward-backward direction of the vehicle Cr regardless of the current steering angle, if the steering angle reaches the maximum, the driving of the user who parks the vehicle Cr in the parking space can be appropriately supported.

Since a scale S1 is added to the line Ln6, the user can easily recognize a relative distance between the vehicle Cr and the parking space.

In the third embodiment, the synthetic image of the vehicle Cr that is viewed from above is generated by synthesizing the images photographed by the cameras 11 to 14 and indicating the surroundings of the vehicle Cr, and the line Ln6 indicating the driving trajectory is overlapped with the synthetic image. However, the line indicating the driving trajectory may be overlapped with each of the images photographed by the cameras 11 to 14 and indicating the surroundings of the vehicle Cr, rather than the synthetic image.

Figure 23:
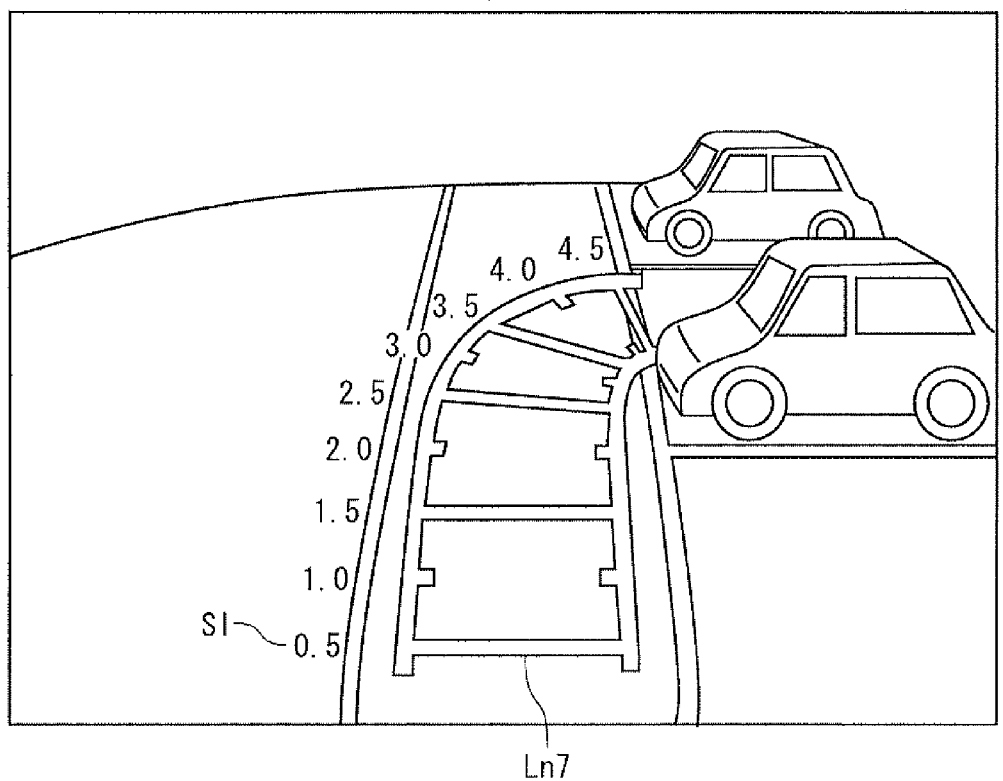
FIG. 23 is a diagram illustrating an example of an image photographed by a rear camera and indicating rear surroundings of a vehicle according to the third embodiment.

For example, a line Ln7 indicating a driving trajectory may be overlapped with an image photographed by the rear camera 14 and indicating rear surroundings of the vehicle Cr, as shown in FIG. 23.

The above-described embodiments include the following inventions.

(1) A image display system configured to display an image, includes an image obtaining unit configured to obtain a surrounding image indicating surroundings of a vehicle, a steering angle obtaining unit configured to obtain a steering angle of the vehicle, an extracting unit configured to extract a driving trajectory of the vehicle which is predicted based on the steering angle, an overlapping unit configured to overlap a line indicating the driving trajectory with the surrounding image, and a displaying unit configured to display the surrounding image with which the line is overlapped, wherein, if the steering angle reaches a maximum, the overlapping unit sets a length of the line as a length corresponding to a distance of the driving trajectory from an end of the vehicle at an advancing direction side to a position where an extending direction of the driving trajectory is perpendicular to a forward-backward direction of the vehicle regardless of the steering angle.

Accordingly, since the length of the line indicating the driving trajectory is set as a length corresponding to the distance of the driving trajectory from the end of the vehicle at the advancing direction side to the position where the extending direction of the line of the driving trajectory is perpendicular to the forward-backward direction of the vehicle regardless of the current steering angle, if the steering angle reaches the maximum, driving of a user who parks the vehicle in a parking space can be appropriately supported.

(2) In the image display system described in above (1), the overlapping unit adds a scale indicating a distance from the end of the vehicle at the advancing direction side to the line indicating the driving trajectory.

Accordingly, since the scale is added to the line indicating the driving trajectory, the user can easily recognize a relative distance between the vehicle Cr and the parking space.

What is claimed is:

1. An image display system configured to display an image, comprising:
   an obtaining unit configured to obtain a surrounding image indicating surroundings of a vehicle;
   a plurality of detectors disposed on the vehicle at different positions and configured to detect an object existing around the vehicle and to detect a distance between each of the detectors and the object, respectively;
   a specifying unit configured to specify a specific detector which has detected the object from among the plurality of detectors, and to specify a specific distance between the specific detector and the object;
   an indicator selection unit configured to select an indicator in the form of a frame based on the specific detector and the specific distance;
   an overlapping unit configured to overlap the indicator with the surrounding image, the indicator indicating the object and the specific detector; and
   a display configured to display the surrounding image with which the indicator is overlapped.

2. The image display system according to claim 1, wherein if there are a plurality of specific detectors which have detected the object, the overlapping unit overlaps an indicator represented in the form of a single frame with the surrounding image, the indicator indicating the object and the plurality of specific detectors.

3. The image display system according to claim 1, wherein the overlapping unit is configured to change a size of the indicator according to the distance.

4. The image display system according to claim 1, wherein the plurality of detectors are a plurality of sonars.

5. The image display system according to claim 4, wherein the plurality of sonars comprises:
- a first sonar disposed in a proximity of a front left corner of the vehicle;
- a second sonar disposed in a proximity of a front center of the vehicle;
- a third sonar disposed in a proximity of a front right corner of the vehicle;
- a fourth sonar disposed in a proximity of a rear left corner of the vehicle;
- a fifth sonar disposed in a proximity of a rear center of the vehicle; and
- a sixth sonar disposed in a proximity of a rear right corner of the vehicle.

6. An image processing apparatus configured to process an image, comprising:
- an obtaining unit configured to obtain a surrounding image indicating surroundings of a vehicle;
- a specifying unit configured to specify, from among a plurality of detectors which are disposed on the vehicle at different positions and configured to detect an object existing around the vehicle, respectively, a specific detector which has detected the object, and to specify a specific distance between the specific detector and the object;
- an indicator selection unit configured to select an indicator in the form of a frame based on the specific detector and the specific distance;
- an overlapping unit configured to overlap the indicator with the surrounding image, the indicator indicating the object and the specific detector; and
- an outputting unit configured to output the surrounding image with which the indicator is overlapped to a display.

7. An image display method for displaying an image, comprising:
- obtaining a surrounding image indicating surroundings of a vehicle;
- detecting an object existing around the vehicle using a plurality of detectors which are disposed on the vehicle at different positions and configured to detect the object existing around the vehicle, and detecting a distance between each of the detectors and the object, respectively;
- specifying a specific detector which has detected the object from among the plurality of detectors, and specifying a specific distance between the specific detector and the object;
- selecting an indicator in the form of a frame based on the specific detector and the specific distance;
- overlapping the indicator with the surrounding image, the indicator indicating the object and the specific detector; and
- displaying the surrounding image with which the indicator is overlapped.

8. An image display system configured to display an image, comprising:
- an obtaining unit configured to obtain a surrounding image indicating surroundings of a vehicle;
- a detector configured to detect an object existing around the vehicle and a distance between the detector and the object;
- a specifying unit configured to specify a specific detector which has detected the object and to specify a specific distance between the specific detector and the object;
- an indicator selection unit configured to select an indicator in the form of a frame based on the specific detector and the specific distance;
- an overlapping unit configured to overlap the indicator with the surrounding image, the indicator indicating the object and the detector which has detected the object; and
- a display configured to display the surrounding image with which the indicator is overlapped.

* * * * *